United States Patent [19]
Sharp

[11] Patent Number: 4,574,176
[45] Date of Patent: Mar. 4, 1986

[54] METHOD AND APPARATUS FOR PULSED HIGH ENERGY DENSITY WELDING

[75] Inventor: Charles M. Sharp, Mount Arlington, N.J.

[73] Assignee: SWS Incorporated, Landing, N.J.

[21] Appl. No.: 555,641

[22] Filed: Nov. 28, 1983

[51] Int. Cl.$^4$ .............................................. B23K 26/00
[52] U.S. Cl. ................ 219/121 LD; 219/64; 219/121 ED; 219/121 EC; 219/121 LC; 219/121 LB; 219/121 LZ
[58] Field of Search ................ 219/121 LC, 121 LD, 219/121 LB, 121 LW, 121 LZ, 121 LX, 121 LY, 121 EV, 121 EW, 121 EX, 121 EU, 121 ED, 64

[56] References Cited

U.S. PATENT DOCUMENTS

| | | | |
|---|---|---|---|
| 4,121,087 | 10/1978 | Malmuth | 219/121 LC |
| 4,152,575 | 5/1979 | Banas | 219/121 LM |
| 4,167,662 | 9/1979 | Steen | 219/121 L |
| 4,185,185 | 1/1980 | Adlam | 219/121 LM |
| 4,272,004 | 6/1981 | Nilsen | 228/17.5 |
| 4,315,132 | 2/1982 | Saurin et al. | 219/121 LD |
| 4,341,943 | 7/1982 | Nilsen | 219/121 LD |
| 4,354,090 | 10/1982 | Nilsen | 219/121 LC |
| 4,376,886 | 3/1983 | Sciaky et al. | 219/121 EV X |
| 4,436,979 | 3/1984 | Nilsen | 219/121 LY |
| 4,471,204 | 9/1984 | Takafuji et al. | 219/121 LC |
| 4,485,935 | 12/1984 | Stoffel | 220/270 |
| 4,497,995 | 2/1985 | Nilsen | 219/121 LC |

FOREIGN PATENT DOCUMENTS

| | | | |
|---|---|---|---|
| 3206210 | 9/1983 | Fed. Rep. of Germany | 219/121 LD |
| 148599 | 6/1981 | German Democratic Rep. | 219/121 EW |
| 52-62146 | 5/1977 | Japan | 219/121 LD |
| 56-151185 | 11/1981 | Japan | 219/121 EU |
| 593757 | 12/1977 | Switzerland | |
| 1579601 | 11/1980 | United Kingdom | 219/121 LC |

OTHER PUBLICATIONS

Alwang et al., "Continuous Butt Welding Using $CO_2$ Laser", Welding Research Supplement, Mar. 1969, pp. 110–115.

Webster, "Welding at High Speed with $CO_2$ Laser", Metal Progress, Nov. 1970, pp. 59–61.

"Surface Rippling Induced by Surface-Tension Gradients During Laser Surface Melting", T. R. Anthony and H. E. Cline, Journal of Applied Physics, vol. 48, No. 9, Sep. 1977; pp. 3888–3894.

"Effect of Surface Tension and Metal Flow on Weld Bead Formation", by B. J. Bradstreet, Welding Research Supplement; Jul. 1968; pp. 314–322.

"Theory and Application of Pulsed Laser Welding" by J. E. Anderson and J. E. Jackson; Welding Journal, Dec. 1965; pp. 1018–1026.

"The Laser Welding of Steels Used in Can Making", by J. Mazumder and W. M. Steen, Welding Journal, Jun. 1981, pp. 19–25.

Primary Examiner—C. L. Albritton
Assistant Examiner—Alfred S. Keve
Attorney, Agent, or Firm—Antonelli, Terry & Wands

[57] ABSTRACT

A method and apparatus for high speed welding are disclosed wherein a continuous weld is formed at high speed along a member with a plurality of overlapping welds formed by pulses of high density energy from a pulsed high energy density welding device such as an electronically pulsed gas laser. The movement of the member being welded is detected in the vicinity of the pulsed laser. The pulsed laser is controlled in response to the detected movement so that the energy for welding from the pulses per unit length of the member being welded is accurately controlled. The control of the laser involves pulsing of the laser in response to the detected movement of the member so that the pitch of the overlapping welds along the member is substantially constant. Also, the power of the laser pulses is controlled and adjusted in a predetermined manner in response to the detected movements. The high speed movement of the member is detected by detecting the leading edge of the moving member at or upstream of the pulsed laser and also continuously detecting the position of the moving member at or as it moves past the pulsed laser. High quality welds can be made in materials at speeds of 22–40 m/min. or more with the method and apparatus.

31 Claims, 32 Drawing Figures

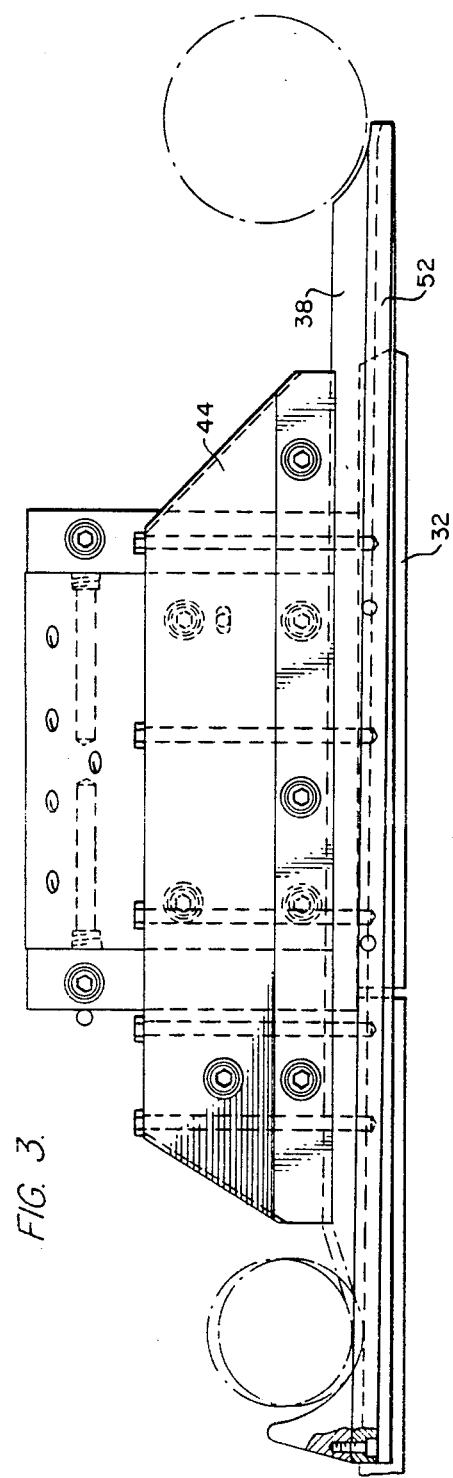
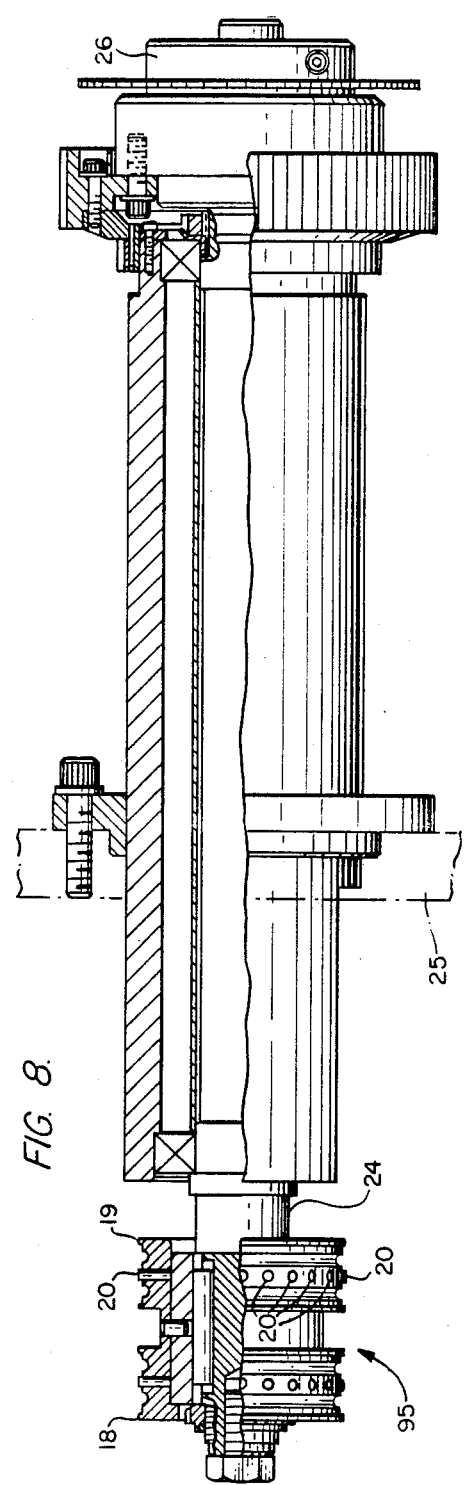

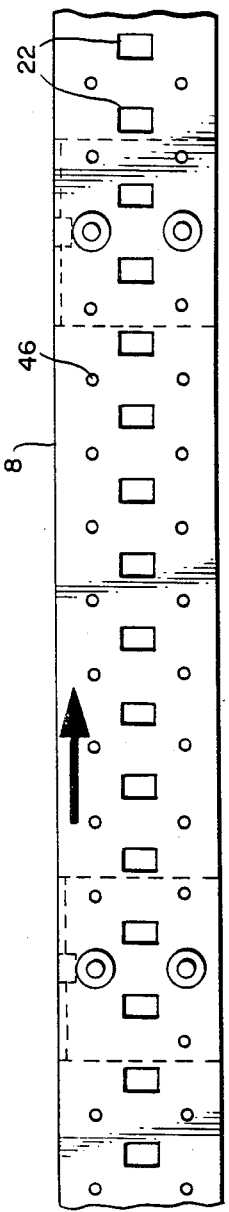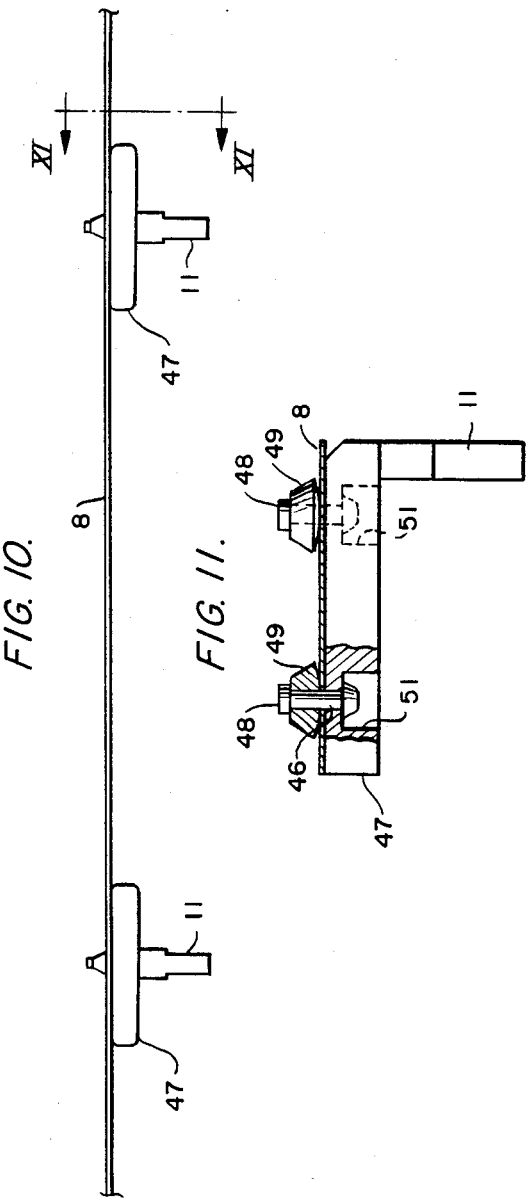

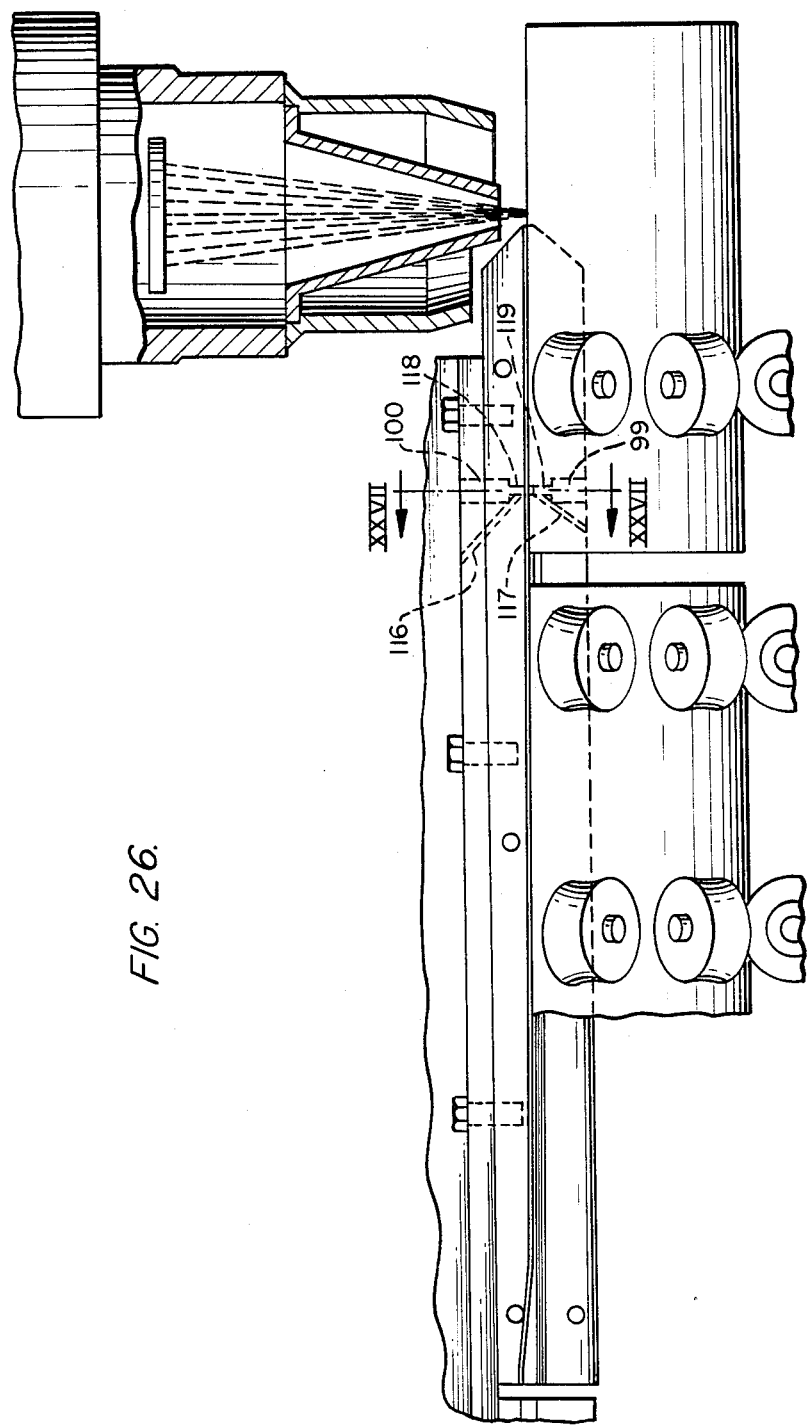

METHOD AND APPARATUS FOR PULSED HIGH ENERGY DENSITY WELDING

BACKGROUND AND SUMMARY OF THE INVENTION

The present invention is directed to a method and apparatus for forming a weld in a member moving at high speed relative to a high energy density welding device such as a laser. More particularly, the invention relates to the formation of a continuous weld along the length of a member moving at high speed relative to a pulsed high energy density welding device such as a pulsed laser wherein the continuous weld is made of a plurality of overlapping spot welds formed by pulses of energy having an average energy or power density of at least $10^6$ watts/inch$^2$. The method and apparatus of the invention may be used to form high quality welds in materials such as thin sheet metal for making can bodies and the like at speeds at least comparable to other joining techniques.

The speed at which high quality autogenous welds can be made using a high power laser has been a subject of considerable interest in recent years, especially as it relates to the welding of thin sheet material. The June, 1981 *Welding Journal* article entitled "The Laser Welding of Steels Used In Can Making" by J. Mazumder and W. M. Steen reports on an investigation undertaken to establish the ability of a laser to weld the metals used in can making. The operating and metallurgical results of laser welding 0.2 mm (0.008 in.) thick tin plate and tin-free 0.4 mm thick steel with a 2 kW continuous wave (CW) $CO_2$ laser were recorded during the investigation. Weld speeds attained with lap welding of the 0.2 mm material were 7-8 meters per minute (m/min.) and 10-20 m/min. for bead-on-plate welds in 0.2 mm material. Mazumder and Steen note that these speeds are low compared to present can making speeds employing other joining techniques such as lock seam-soldering and electrical resistance welding. However, the authors state that higher speeds can be achieved with laser welding by augmenting the laser with an electric arc. It is reported that speeds of approximately 60 m/min. were attained with bead-on-plate welds on 0.2 mm thick tin plate using a laser on one side of the sheet and an electrical arc on the opposite side of the sheet.

U.S. Pat. No. 4,315,132 to Saurin et al. discloses a process and apparatus for welding tubular bodies, particularly for preserved food cans, wherein welding speeds on the order of 20 m/min. in sheet material 0.2 to 0.3 m/min. thick are reported using a continuous emission 1 kW laser. While Saurin et al. suggest that the speed may be substantially increased with a more powerful laser of 2 kW for example, applicant has found that high quality CW laser welds cannot be consistently obtained at speeds above about 22 m/min. with the Saurin et al. method regardless of the increase in laser power. That is, laser welds formed by a continuous laser beam in materials moving at speeds above approximately 22 m/min. are prone to surface irregularities and undercutting which are unacceptable for can making and most other applications.

Problems associated with high speed welding have been variously referred to in the art as surface rippling, humping or slubbing. T. R. Anthony and H. E. Cline present a theoretical discussion of surface rippling during laser welding in their article "Surface rippling induced by surface-tension gradients during laser surface melting and alloying" in the *Journal of Applied Physics*, Volume 48, No. 9, September, 1977. The authors indicate that surface rippling is induced during laser welding by surface-tension gradients. They also state that a high power laser may itself cause surface rippling through other mechanisms such as vapor-pressure depression of the melt surface. The phenomenon of undercutting and humping associated with high speed welding is also discussed by B. J. Bradstreet in his July, 1968, *Welding Journal* article entitled "Effect of Surface Tension and Metal Flow on Weld Bead Formation".

Regardless of the theoretical explanation of the problems associated with high speed welding, the practical effect of such phenomena is to prevent the attainment of consistently high quality laser welds at high speeds, such as 22 m/min. or more. For example, FIGS. 22A-22D of the drawings illustrate bead-on-plate CW laser welds made at a speed of 30 m/min. Weld irregularities or defects 98, 120 and 121 exist at periodic intervals along the length of the weld. During welding molten metal is dragged along the weld joint and periodically dumped at locations 98 leaving channeling 120 beneath the deposits, while weld joint portions between the deposits 98 are subject to undercutting and incomplete weld nugget formation with thru slots of the type shown at 121, for example, the causes of these weld irregularities are not fully understood but are believed to be related to the surface-tension gradients on the molten metal from temperature and pressure gradients in and around the weld puddle during laser welding as referred to above. Increasing the laser power during welding does not eliminate the problem.

The suggestion that higher laser power necessarily results in higher welding speeds is also disputed by Steen in his U.S. Pat. No. 4,167,662 wherein it is indicated that welding speeds using 15-20 kW lasers have resulted in performance well below those suggested by linear extrapolation from low power work. Possible reasons advanced for this are (1) optical design, (2) masking the workpiece by the laser induced plasma, or (3) some other reason. The patentee states that in any case, the low performance is primarily due to lack of energy reaching the workpiece. Steen suggests that the way ahead for laser processes is not by way of higher laser powers. Rather, Steen's invention is directed to electric arc argumented laser welding to increase welding speed.

A continuous seam weldment is established between two strips of sheet material while the strips are moving by forming a converging Vee geometry between the moving strips, applying a pressure at the point of convergence by pressure rolls and focusing a laser beam into the converging Vee according to U.S. Pat. No. 4,185,185 to Adlam. High welding speeds are reported with this method. However, the use of pressure rolls and continuous strips of material limit the applicability of this type of process. The process is also limited to the production of lap welds.

An object of the present invention is to provide a method and apparatus for forming a continuous weld at high speed which avoids the aforementioned disadvantages and limitations associated with the known joining methods and apparatus. More specifically, an object of the invention is to provide a method and apparatus for forming a continuous weld in a member moving at a high speed, typically 22 m/min. or more, relative to a high energy density welding means such as a laser whereby a weld of high quality can be consistently obtained with the problems of surface rippling, humping and slubbing being avoided.

An additional object of the invention is to provide a method and apparatus for forming a continuous laser weld at high speed in a thin material for manufacturing cans, for example, which do not require the use of an electrical arc to augment the power of the laser or the use of pressure rollers and which method and apparatus are not limited in their applicability to continuous strips of material or to lap type joint configurations but may be used to laser weld discrete articles, such as individual can bodies, regardless of joint configuration.

A further object of the invention is to provide a method and apparatus for high speed welding of coated materials, particularly metal sheet material coated with nonmetallic material.

Swiss Pat. No. 593,757 to Feller discloses a process for welding coated sheet or leaf metal parts together using a $CO_2$ laser wherein the coating is not removed prior to welding. Feller states that the coating is burned or vaporized during the welding. The patent to Feller does not teach or suggest a solution to the aforementioned problems of high speed laser welding or, more particularly, the problems of high speed laser welding of coated materials. Applicant's experience indicates that the continuous laser welding process of Feller is suitable only for the low speed welding of certain types of plain or coated materials. High speed laser welding of coated materials with the Feller method is problematical for the reasons indicated above with respect to high speed welding in general and, moreover, because at high speeds the problems of loss of welding energy at the work due to reflection by the coating or vaporization thereof may be aggravated. Also, the coating material can become distributed in the weld puddle which may be detrimental to the metallurgical properties of the weld causing weld porosity and/or weld cracking. These problems make some coated materials impossible to laser weld, especially at high speeds. In addition, with a continuous process of the type suggested by Feller, the contaminants may be dragged along the weld and concentrated periodically in the weld puddle causing irregular welds that are weak or structurally unsound and cosmetically unacceptable. For example, porosity can be induced in the contaminated weld areas to produce a defective weld.

Thus, another object of the present invention is to provide a method and apparatus for laser welding coated materials at high speeds and with high weld quality whereby the aforementiond problems associated with the prior art methods are avoided or minimized.

An additional object of the invention is to provide a method and apparatus for forming a continuous laser weld at high speed in a member such that the energy for welding from the laser per unit length of the member can be accurately controlled and varied in a predetermined manner so as to optimize the weld quality for a given material.

These and other objects are attained according to the invention by providing a method of forming a continuous weld at high speed comprising the steps of moving a member to be welded at high speed relative to a pulsed high energy density welding means such as a laser, forming a continuous weld along the member with a plurality of overlapping welds formed by pulses of energy from the pulsed high energy density welding means, the pulses having an average energy density of at least $10^6$ watts/inch$^2$, detecting the movement of the moving member in the vicinity of the welding means and controlling the pulsed high energy density welding means during the welding in response to the detected movement of the moving member so that the energy for welding from the pulses per unit length of the member is accurately controlled.

While pulsed laser welding, per se, at low welding speeds is known, see the December, 1965 *Welding Journal* article by J. E. Anderson and J. E. Jackson entitled "Theory and Application of Pulsed Laser Welding" and also more recently U.S. Pat. No. 4,152,575 to Banas, for example, it has been discovered that the problem of surface irregularities and weld defects which limit the speed at which high quality welds can be made in thin materials as discussed above can be overcome by welding at high speed with intermittent pulses of laser energy. Each of the pulses has a duration of only microseconds and forms a discrete spot weld. The spot welds are formed so as to overlap and form a continuous weld. The surface rippling, humping and slubbing problems associated with high speed CW laser welding are avoided or substantially overcome by this method. That is, with the method of the invention there is no continuous molten weld puddle to be swept along by surface-tension gradients but rather a series of discrete puddles which quickly solidify before the surface-tension gradients or vapor pressure depression of the melt can produce irregularities. Therefore, the method and apparatus of the invention make it possible to produce laser welds of high quality in materials at speeds heretofore unattainable without the use of special provisions such as electrical arc argumentation of the laser power or the use of pressure rollers in combination with the laser beam.

The high speed laser welding of materials having coatings and contaminants thereon is also facilitated with the method and apparatus of the invention by pulsing the laser beam to form a series of overlapping spot welds. The pulses of laser energy vaporize the coating during welding and reduce the weld puddle contamination. For this purpose, each pulse of laser energy preferably includes a relatively high peak of laser power at the beginning thereof which vaporizes the coatings and contaminants and aids absorption of the welding energy by the member. Because the continuous weld is formed by a series of overlapping spot welds, contaminants from the coating have less time to enter the weld puddle and are not swept along and periodically concentrated as with a weld formed by a continous laser beam. Instead, any weld contaminants which are not vaporized are distributed along the weld in a concentration level and/or frequency which is generally not high enough to cause the previously mentioned metallurgical problems associated with welding such materials. A weld formed at high speed according to the invention also has a very even, uniform appearance.

Further, according to the method of the invention, the high speed movement of the member to be welded is detected in the vicinity of the pulsed high energy density welding means and the pulsed high energy density welding means is controlled during welding in response to the detected movement so that the energy for welding from the pulses per unit length of the member is accurately controlled. More specifically, by controlling the actual pulsing of the welding means such as a laser in response to the detected movement of the member, the pitch of the plurality of overlapping welds can be made substantially constant even with changes in the speed of movement of the member.

According to a disclosed, preferred embodiment of the invention, the method step of detecting the movement of the moving member includes detecting the leading edge of the moving member upstream of a pulsed laser welding means and continuously detecting the position of the moving member as it moves past the pulsed laser welding means. This permits the accurate initiation of laser welding with respect to the moving member and the accurate control of the energy for welding along the length thereof.

The trailing edge of the moving member is also detected upstream of the pulsed laser welding means according to the method. This, together with the continuous detection of the position of the member as it moves past the pulsed laser welding means, enable the pulsed laser welding means to be controlled so as to terminate welding at a precise, predetermined location along the moving member with respect to the trailing edge thereof.

Further, in the disclosed embodiment the step of controlling the pulsed laser welding means of the invention includes varying or adjusting the power of the laser pulses in a predetermined manner in response to the detected movement of the moving member. Thus, the step of controlling the pulsed laser welding means may include initiating the welding of the member at a first relatively low laser power level and then increasing the laser power level to a second relatively high power level at a predetermined distance along the moving member. The power level may also be decreased from the second relatively high power level to a third relatively lower power level at a predetermined distance before the end of the weld. As discussed more fully hereinafter, the accurate control of the laser power along the length of a member being welded permits heat input related metallurgical welding problems, such as thermally induced metallurgical failure or tearing at the beginning or end of welds, to be minimized or avoided.

An apparatus of the invention for forming a continuous weld along a member at high speed with a plurality of overlapping welds formed by pulses of energy comprises a pulsed high energy density welding means, means for moving a member to be welded at high speed relative to the pulsed high energy density welding means, means for detecting the movement of the moving member in the vicinity of the welding means, and control means for controlling the pulsed welding means in response to the detected movement of the moving member so that the energy for welding from the pulses per unit length of the member is accurately controlled. In the disclosed, preferred embodiment the pulsed high energy density welding means is a pulsed laser welding means and the control means for controlling the pulsed laser welding means controls the pulsing of the pulsed laser welding means in response to the detected movement of the member thereby permitting the pitch of the plurality of overlapping welds along the member to be substantially constant even with changes in the speed of movement of the member.

The pulsed laser welding means preferably provides pulses of laser energy which each have a relatively high peak of laser power at the beginning thereof. This is particularly advantageous for welding thin sheet materials having coatings or contaminants thereon as the coatings are vaporized by the high power at the beginning of the pulses and thereafter the remaining energy of the pulses can be efficiently used to effect welding. By welding at high speed with discrete pulses, there is also less chance for a cloud of vaporized coating or contaminate to interfere with the transmission of light energy to the member being welded.

The means for detecting the movement of the moving member detects the leading edge of the moving member at or upstream of the pulsed laser welding means and continuously detects the position of the moving member as it moves past the pulsed laser welding means. According to the disclosed embodiment, the means for continuously detecting the position of the moving member includes an encoder connected to the means for moving the member. The output of the encoder is provided to the control means for controlling the pulsed laser welding means. In the illustrated embodiment, the control means includes a digital-to-analog converter which is driven by the output of the encoder to control the pulsed laser welding means in a predetermined manner with respect to the position or length of the member. The control means also includes means for firing or pulsing the laser at predetermined positions along the moving member whereby the pulse pitch can be maintained constant regardless of changes in the speed of movement of the member. This is accomplished by a circuit within the control means which counts the pulses from the encoder and fires or pulses the laser at predetermined pulse intervals which correspond to changes in position of the moving member.

In the illustrated embodiment, the members being welded are generally cylindrically shaped with longitudinally extending edges which are to be laser butt welded to form can bodies or the like. In the apparatus a Z-bar guide is provided for guiding the edges into abutting position for laser welding as the member is moved at high speed in the direction of the pulsed laser welding means. The leading and trailing edges of the moving members are detected by a detector such as a light source and light detector located on opposite sides of the moving member in the Z-bar guide upstream of the welding means. In another form of the invention these edges are detected at the welding site or pulsed laser welding means by a light detector which detects the light from the weld plasma, or the absence thereof, as the moving members move into and out of contact with the pulsing laser beam.

These and other objects, features and advantages of the present invention will become more apparent from the following description when taken in connection with the accompanying drawings, which show, for purposes of illustration only, one preferred embodiment in accordance with the present invention.

BRIEF DESCRIPTION OF THE DRAWINGS·

FIG. 3 is a detailed side view of the Z-bar support assembly illustrated generally in FIG. 2;

FIG. 8 is a partial cross sectional view of the drive sprocket and its supporting shaft taken along the line VIII—VIII in FIG. 2;

FIG. 9 is a plan view of a portion of a preferred form of metal belt for the apparatus of the invention;

FIG. 10 is a front view of the metal belt shown in FIG. 9;

FIG. 11 is a cross sectional view of the metal belt of FIG. 10 taken along the line XII—XII and illustrating the manner of attachment of a base plate with finger to the belt;

FIG. 26 is a front side view of a portion of the disclosed apparatus illustrating the Z-bar and detector therein for detecting the leading and trailing ends of the moving can bodies upstream of the laser welding area;

DESCRIPTION OF THE PREFERRED EMBODIMENT

Figure 22A:
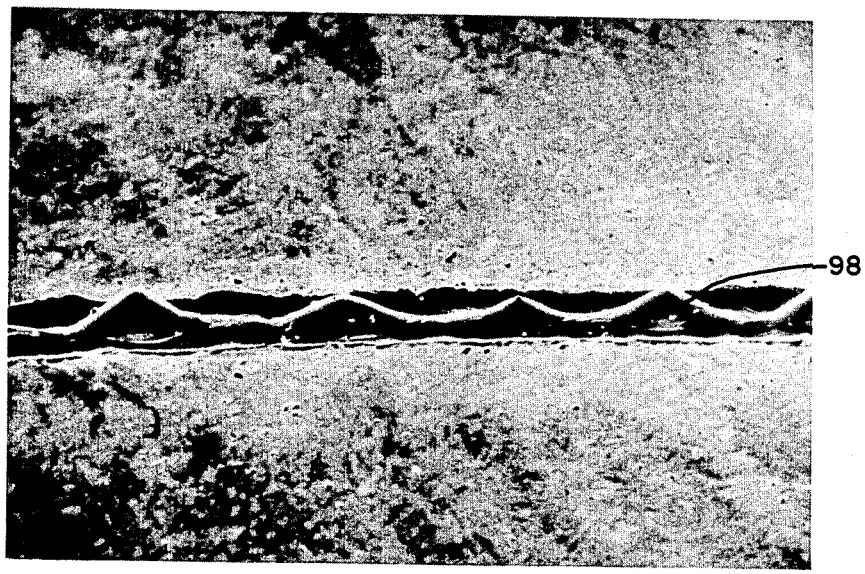
FIG. 22A is a view from above and to one side of a bead-on-plate, CW laser weld formed on 0.008 inch thick low carbon steel sheet material at a weld speed of 30 m/min. and showing the build up of individual slubs and the undercutting at the weld edges.
Figure 22B:
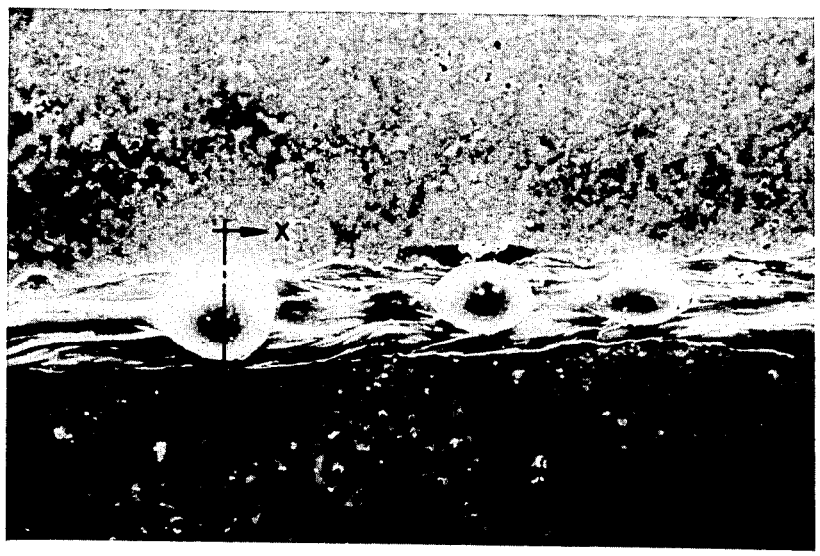
FIG. 22B is a plan view of a bead-on-plate, CW laser weld formed on 0.008 inch thick low carbon steel sheet material at a weld speed of 30 m/min. and illustrating slubs which have formed spheres.
Figure 22C:
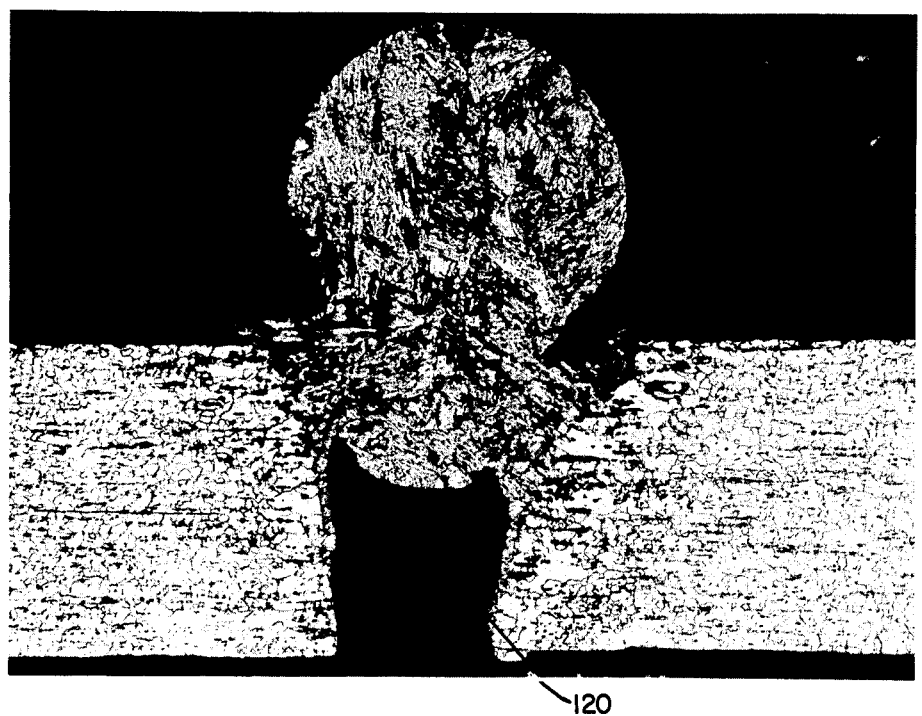
FIG. 22C is a photomicrograph showing a transverse section through a slub along the weld of FIG. 22B wherein channeling which occurs on the underside of the weld is clearly visible.
Figure 22D:
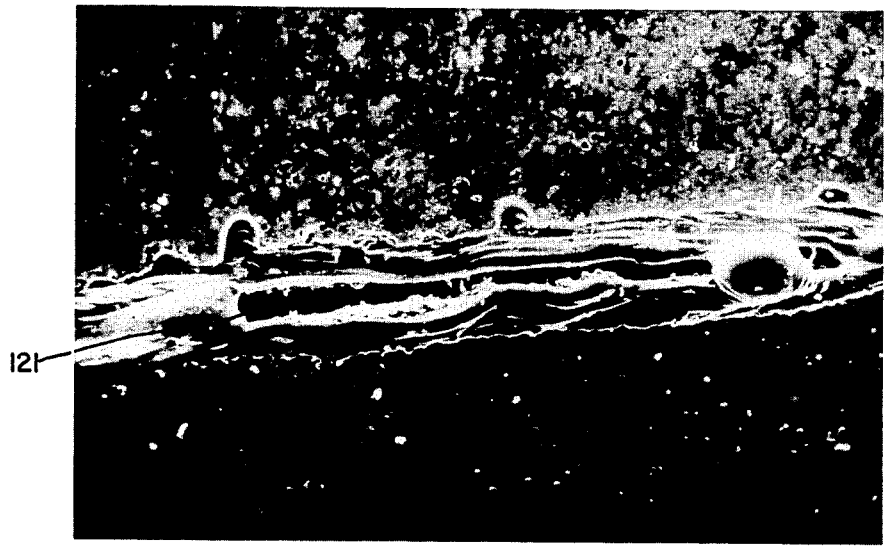
FIG. 22D is a plan view of a bead-on-plate, CW laser weld formed on 0.008 inch thick low carbon steel sheet material at a weld speed of 30 m/min. and showing how the combination of cumulative slubbing and channeling has resulted in a thru slot being formed.

Referring now to the drawings, FIGS. 22A-22D illustrate the catastrophic nature of slubbing. In particular, FIG. 22A shows the build up of individual slubs 98 and the undercutting at the weld edges for a bead-on-plate, CW laser weld formed on 0.008 inch thick low carbon steel sheet material at a weld speed of 30 m/min. and with the power of the laser beam selected to be sufficient to obtain complete penetration of the steel sheet material. FIG. 22B illustrates a CW laser weld formed in a similar manner wherein the slubs have formed as spheres. A photomicrograph showing a transverse section along lines X—X through a slub of the weld of FIG. 22B is shown in FIG. 22C wherein it can be seen that channeling 120 occurs beneath the slubs. The weld shown in FIG. 22D was made like that in FIGS. 22A and 22B and shows how the combination of cumulative slubbing and channeling has resulted in a thru slot 121 being formed along the weld, i.e. the channeling extends completely through the welded material between the slubs.

These types of weld defects have been found to occur in high speed CW laser welds that is, welds made at speeds of approximately 22 m/min. or higher, in materials having a wide variety of thickness and weld joint types. Further, the weld defects have not been eliminated by increasing the power of the CW laser beam.

The slubs, undercutting and incomplete weld joint formation which tend to occur as a result of the forces that occur at high welding speeds are unacceptable in can bodies and most other articles where a sound, continuous weld or seal of high strength and good appearance are essential. As previously indicated, the reasons for these weld irregularities and defects are not fully understood but are believed to be related to the surface-tension gradients on the molten metal from the temperature and the pressure gradients in and around the weld puddle during laser welding. Regardless of the theoretical explanation, the practical effect is to prevent the attainment of consistent high quality laser welds at high speeds of approximately 22 m/min. or more.

Figure 1:
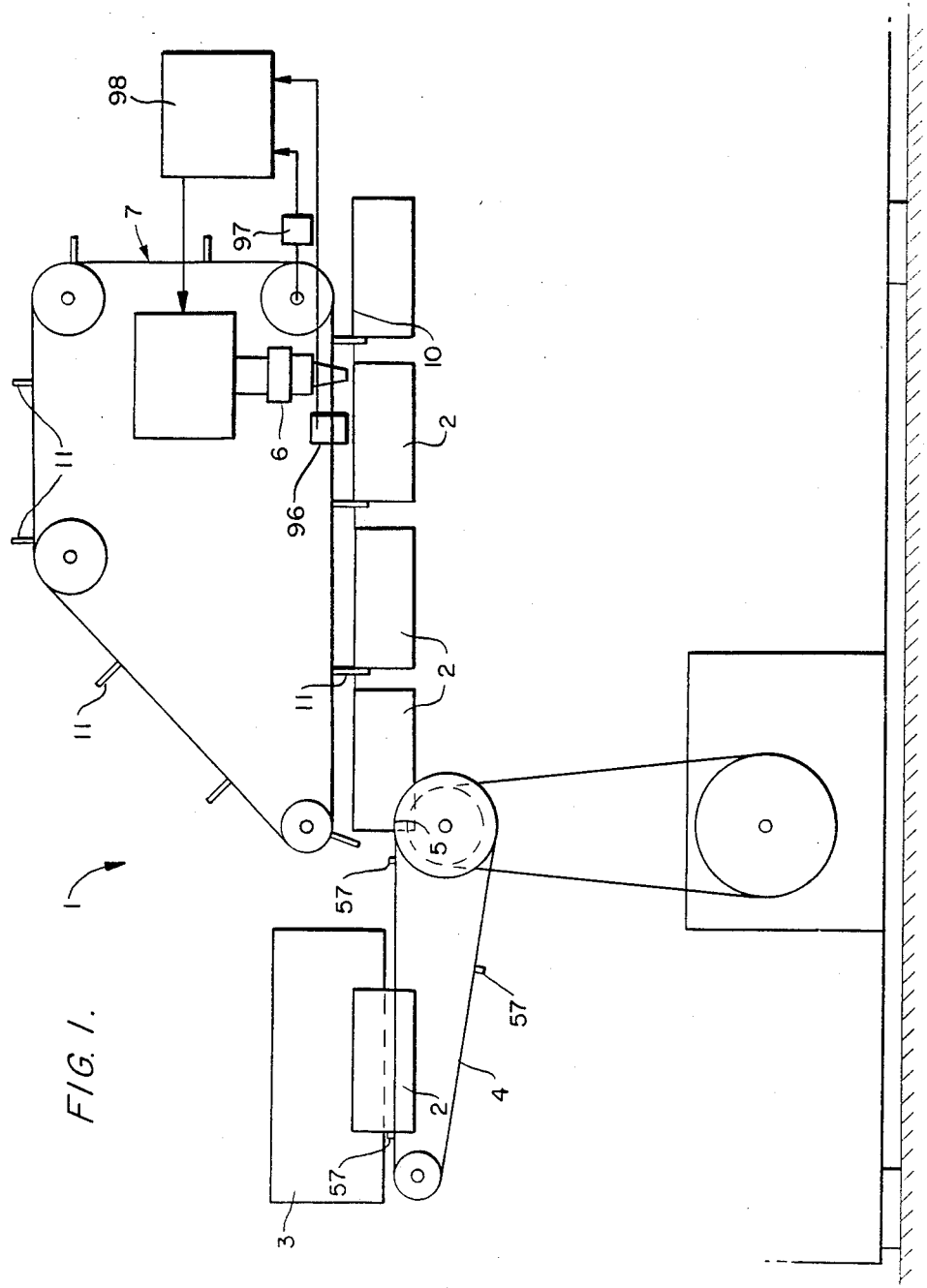
FIG. 1 is a schematic front side view of an apparatus according to the invention for continuously forming and laser welding metal can bodies.
Figure 2:
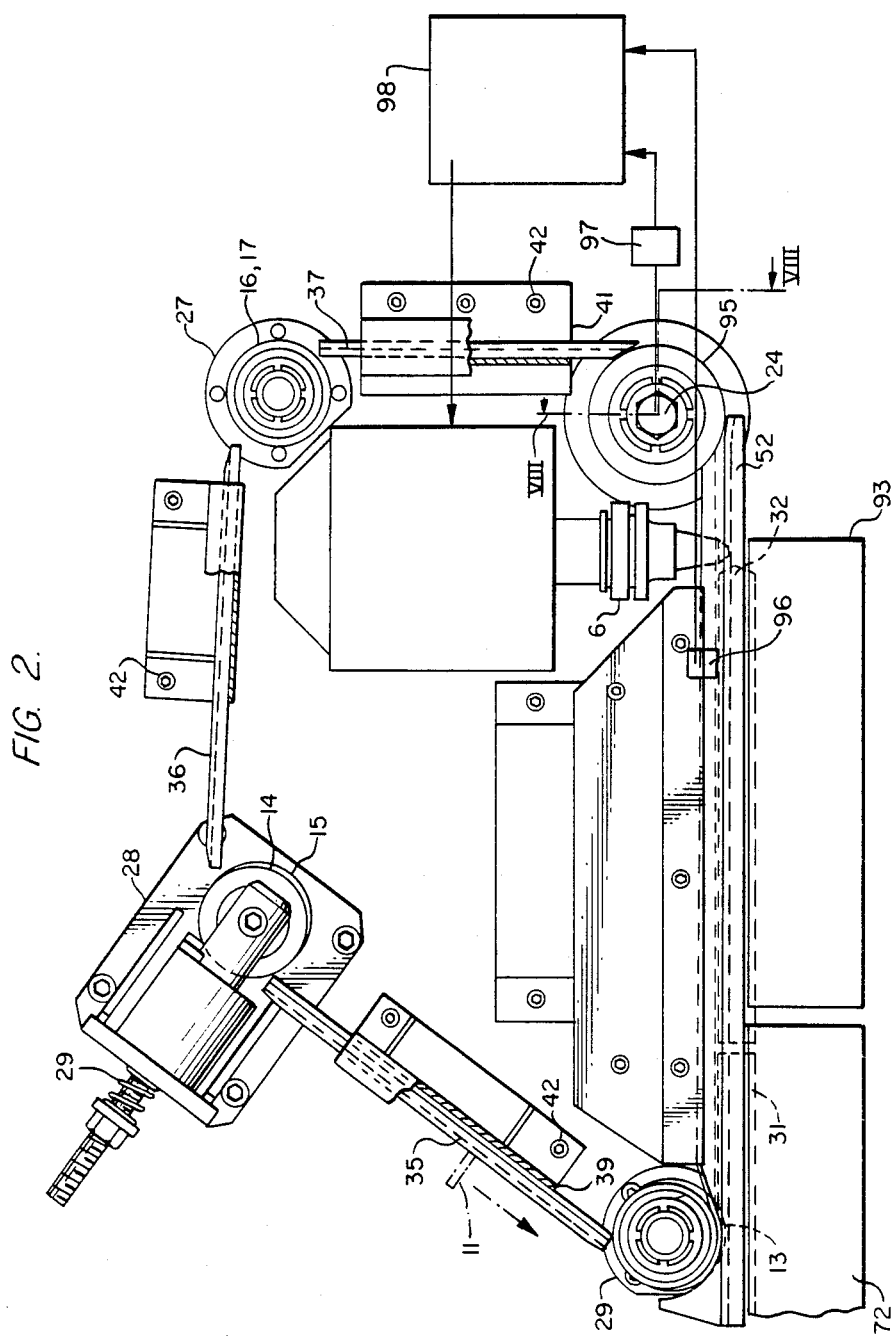
FIG. 2 is a front side view of the belt guides and drive sprocket of the apparatus shown schematically in FIG. 1.
Figure 5:
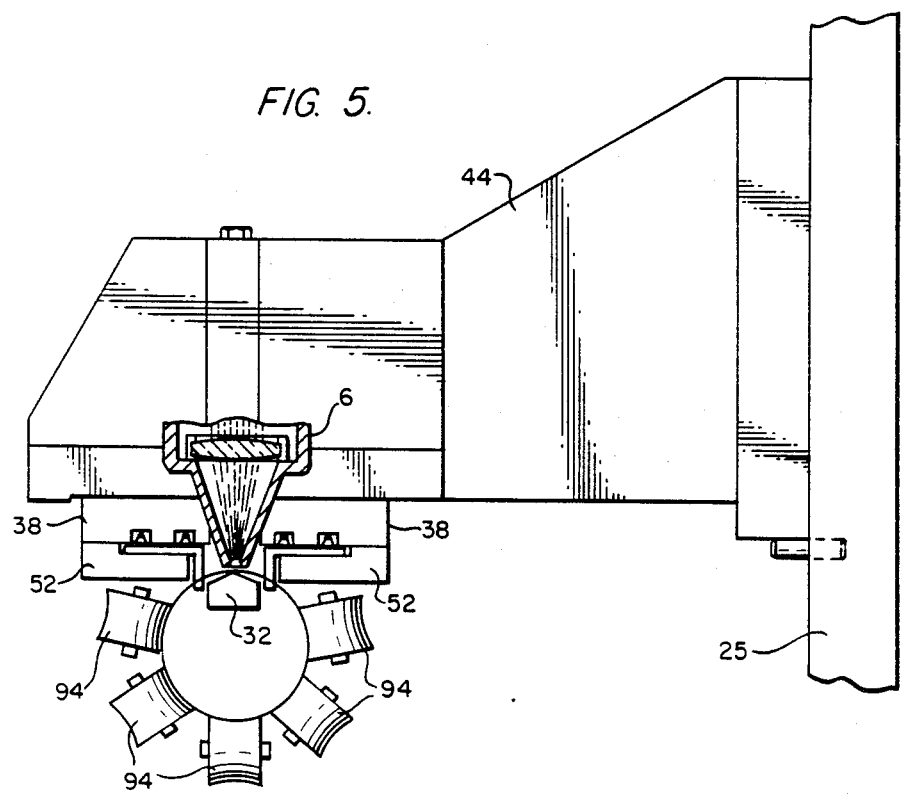
FIG. 5 is an end view of the Z-bar support assembly illustrated in FIG. 4 and further showing the pair of metal belts with fingers, the laser welding apparatus and a plurality of support rolls for a metal can body.
Figure 23:
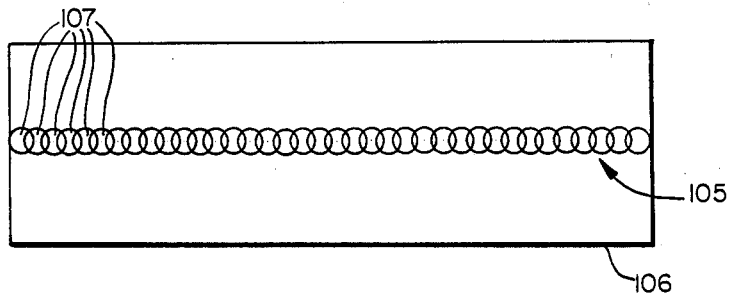
FIG. 23 is a schematic top view of a laser weld made according to the present invention wherein the member is moved at high speed relative to the laser and is welded by forming a plurality of overlapping welds with pulses of laser energy, the energy for welding from the laser pulses per unit length of the member being accurately controlled.

These metallurgical problems associated with laser welding at high speeds are overcome according to the method of the present invention by forming a continuous laser weld, shown schematically at 105 in FIG. 23, by moving the member 106 to be welded at high speed, such as 22 to 40 m/min. or more, relative to a pulsed laser welding means 6, FIGS. 1, 2 and 5, and forming the continous weld 105 along the member with a plurality of overlapping spot welds 107 formed by pulses of laser energy from the pulsed laser welding means. The pulses of laser energy having an average energy density of at least $10^6$ watts/inch$^2$. The movement of the member is detected in the vicinity of the laser welding means and the pulsed laser welding means 6 is controlled during the welding in response to the detected movement of the member so that the energy for welding from the laser pulses per unit length of the member is accurately controlled.

In the preferred embodiment the step of controlling the pulsed laser welding means includes controlling the pulsing or firing of the laser welding means in response to the detected movement of the member so that, for example, the pitch of the plurality of overlapping welds along the member can be maintained substantially constant even with changes in the speed of movement of the member during welding.

Further, according to the preferred embodiment, the step of controlling the pulsed laser welding means in response to the detected movement of the moving member also includes adjusting the power of the laser pulses in a predetermined manner in response to the detected movement of the member. When laser butt welding the longitudinal side seam of a can body, it has been discovered that the susceptibility of the weld metal to heat affected zone tearing at the ends of the can body can be significantly reduced or eliminated by welding with minimal heat input adjacent the ends, that is, within 0.010–0.012 inch of the ends, for example, and wherein the weld is formed by a plurality of discrete spot welds which are overlapped. The series of discrete weld puddles formed by the pulses quickly freeze to minimize heat input related metallurgical problems and reduce the need for tooling constraints beyond the weld zone.

However, with minimal heat input at the ends of the can body during pulsed laser welding according to the invention, inconsistent penetration in the middle portion of the can body can occur due to possible misdirection or mistracking of the can body as it is moved at high speeds relative to the laser welding means 6. The problem of inconsistent penetration in the middle portion of the can body when minimal heat input is employed for welding the ends of the cans is also aggravated by the fact that heat sinking occurs over an angle of 360° in the middle of the can body but only 180° at the ends. In order to avoid this problem of inconsistent penetration or weld formation while at the same time minimizing the heat input for welding the can ends, according to the invention the power of the laser pulses is adjusted along the length of the weld in the can body in a predetermined manner with respect to the position of the can body so that welding takes place at a first relatively low laser power level or heat input per unit length of the weld at the leading end of the can body and then is increased to a relatively higher power level or heat input per unit length of the weld at a predetermined distance along the weld. The laser power is then reduced from the second relatively higher power level to a third relatively lower power level or heat input per unit length of weld at a predetermined distance from the end of the can body for welding the trailing end thereof with minimal heat input.

Figure 24:
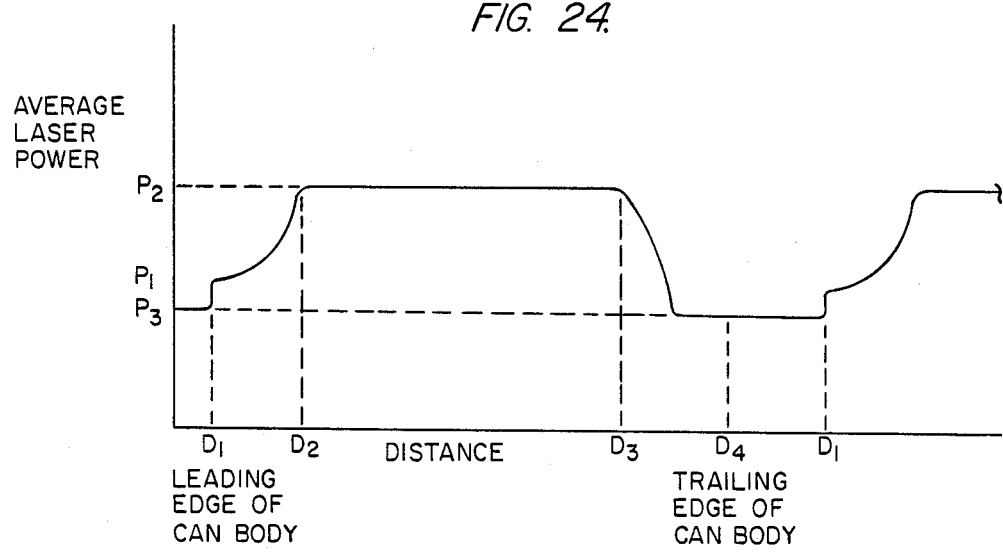
FIG. 24 is a diagram showing the average laser power from the laser pulses as a function of the distance along a can body being welded according to the invention.

Such an adjustment of the power of the laser pulses is illustrated in FIG. 24 wherein the power characteristic of the average laser power of the pulses is depicted as a function of the distance along the length of a can body. At the distance $D_1$, which corresponds to the leading edge of the can body, the average laser power is a first relatively low level $P_1$ and then is progressively increased in a predetermined manner over a predetermined slope, from $D_1$ to $D_2$, to a second relatively higher power level $P_2$. The power level $P_2$ is maintained over the distance $D_2$ to $D_3$ for welding the middle portion of the can body. Near the end of the can body, at location or distance $D_3$ the average laser power of the laser pulses is reduced in a predetermined manner over a predetermined distance from $D_3$ to the trailing end of the can body $D_4$, to a third relatively lower power level $P_3$ which in the illustration is lower than the initial power level $P_1$. At the end of the can body, distance $D_4$, the laser continues to pulse at power level $P_3$ until the leading edge $D_1$ of the next, successive can body is in position for welding at which time the average power level is increased to the level $P_1$ again and the process is repeated for the pulsed laser butt welding of the side seam along the entire length of the next can body.

Figure 25:
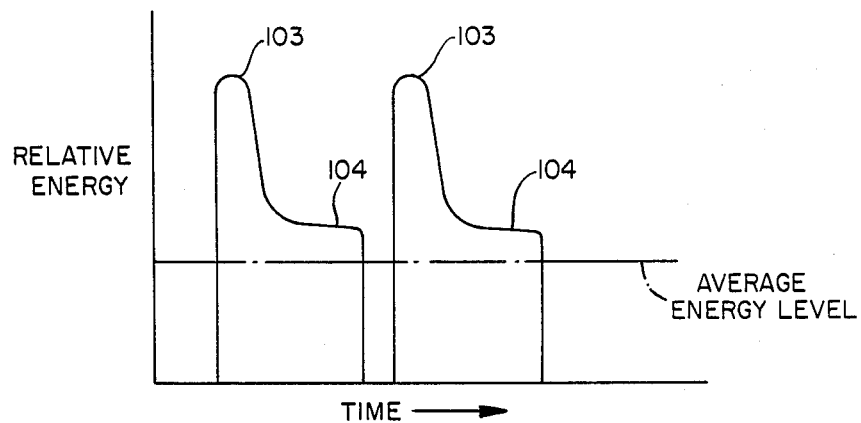
FIG. 25 is a simplified chart showing the configuration of sequential pulses of laser energy.

The method of the invention is particularly advantageous in that it permits the high speed welding of members having a dissimilar material coating in the weld area. Preferably, as illustrated in FIG. 25, the pulses of laser energy each include a relatively high peak 103 of laser power at the beginning thereof which vaporizes the the dissimilar coating and aids absorption of the welding energy by the member during the relatively lower portion 104 of the pulse. For example, with the method of the invention it is possible to weld a metal container body having litho printing, with or without a lacquer or varnish coating thereon, at high speed, 22 m/min. or more, without first removing the coating in the vicinity of the area to be welded. There is less soot produced as compared with a weld formed by a continuous laser beam and the weld quality is high even at the high speeds referred to. Moreover, the method of the invention permits weldments to be formed in materials having a wide variety of dissimilar coatings of various thicknesses whereas with a continuous laser beam high quality weldments of coated materials can be formed only at lower weld speeds and only with materials having selected thin coatings.

An apparatus 1 for forming a continuous laser weld along a member moving at high speed according to the present invention is illustrated in FIGS. 1 and 2. The apparatus comprises means 7 for moving members 2 to be welded at high speed relative to a pulsed laser welding means 6, means 96 and 97 for detecting the movement of the moving members 2 in the vicinity of the laser welding means 6, and control means 98 for controlling the pulsed laser welding means 6 in response to the detected movement of a moving members so that the energy for welding from the laser pulses per unit length of a member is accurately controlled.

The members 2 to be welded are generally cylindrical tubular shaped sheets of metal or other material having longitudinal extending edges to be welded. The tubular members 2 are formed from flat sheets of material by a conventional roll former 3. A forming means could also be used which provides generally tubular shaped sheets of material with cross sections other than round, such as square, for example.

The means 7 for moving the members 10 at high speed relative to the pulsed laser welding means 6 receives the members from an advancing means 4 which successively advances the generally tubular shaped sheets of material 2 from the roll former 3 to a first position 5 in a direction toward the laser welding means such that the generally tubular shaped sheets of material are moving at a predetermined speed at the first position 5. The means 7 constitutes an additional advancing means for continuously advancing the successive moving, generally tubular shaped sheets of material from the first position 5 to a second position 10 at a substantially constant speed. Such an arrangment is disclosed in the commonly assigned U.S. patent application Ser. No. 368,869 filed Apr. 15, 1982 now U.S. Pat. No. 4,497,995, the disclosure of which is incorporated herein by reference.

Figure 4:
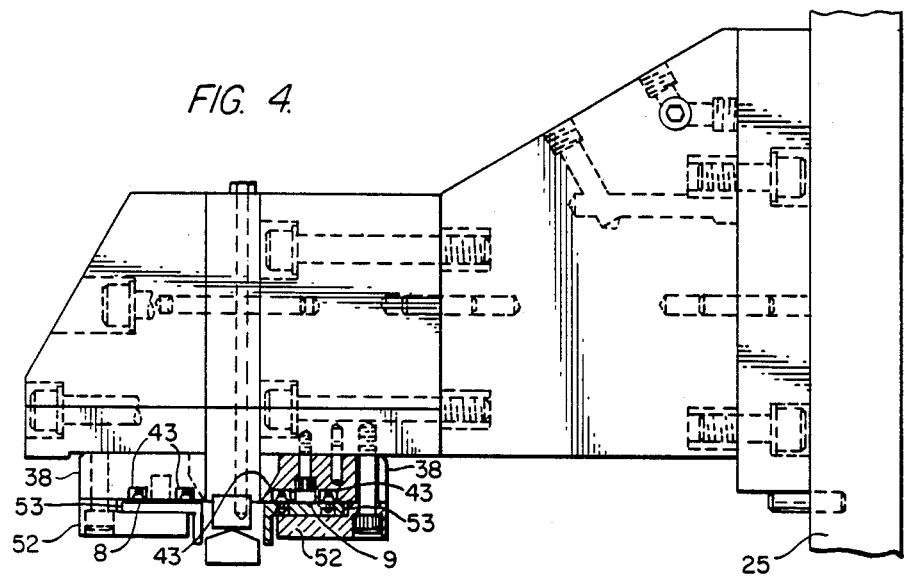
FIG. 4 is a right end view, partially in cross section, of the Z-bar support assembly of FIG. 3.

As indicated in the aforementioned application, the additional advancing means 7 includes a pair of endless metal belts 8 and 9 as illustrated in FIGS. 4 and 5. The metal belts extend between the first and second positions 5 and 10 and each of the belts has a plurality of fingers 11 mounted thereon in spaced relationship for engaging the trailing ends of successive generally tubular shaped sheets of material 2 to advance the sheets.

Figure 7:
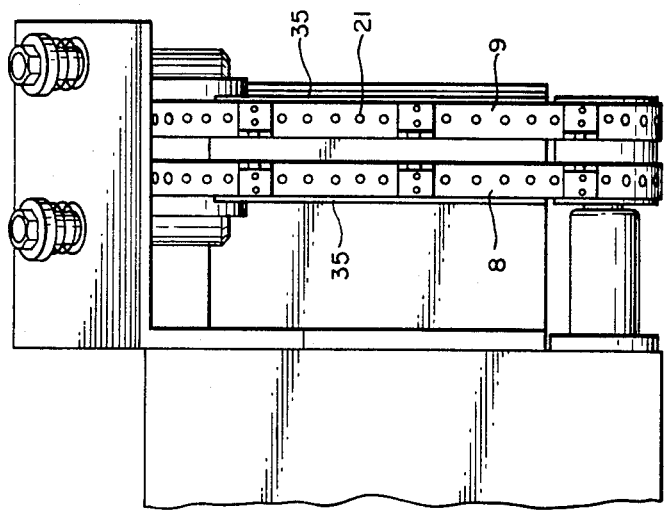
FIG. 7 is a left end view of the apparatus illustrated in FIG. 2 with the metal belts provided about the guide rolls and drive sprocket.
Figure 6:
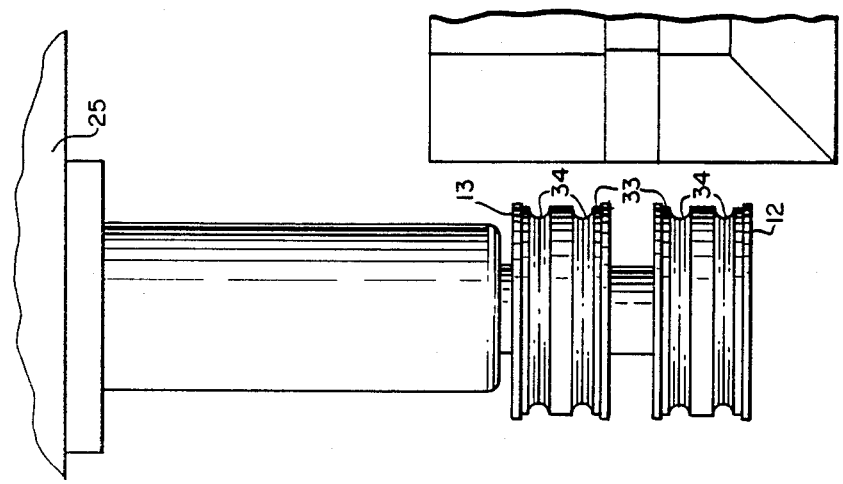
FIG. 6 is a top view of the lower lefthand guide roll shown in FIG. 2.
Figure 12:
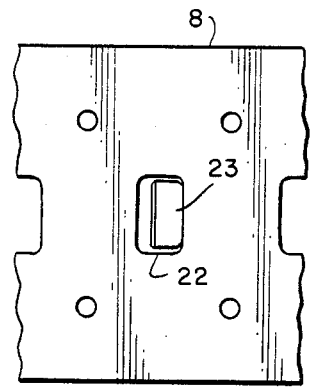
FIG. 12 is an enlarged view of a portion of the metal belt depicted in FIG. 9 and showing a pin or sprocket tooth having a flat face for engaging in the rectangular holes in the belt to drive the same.

The metal belts 8 and 9 are arranged in spaced relationship on opposite sides of the longitudinal extending edges to be welded by means of a plurality of guide rolls 12 through 17 and a drive sprocket 95 illustrated in FIGS. 1 through 8. The driving sprocket 95 includes respective drive sprocket portions 18 and 19. Each of the drive sprocket portions 18 and 19 is provided with a plurality of teeth 20 on its outer surface for drivingly engaging in a series of holes 21 formed in the respective belts. The teeth 20 are formed by the upper portions of pins which are inserted into the respective sprockets in predetermined spaced relationship. As illustrated in FIG. 7, the holes 21 in the belts are circular in shape and the teeth 20 have a complementary shape over the forward portion of the holes. The upper surfaces of the teeth are recessed over the trailing portion of the teeth so as not to interfere with the metal belt during engagement and withdrawal of the teeth from the holes in the belts. Alternatively, according to a preferred form, the holes formed in the belts for receiving the teeth on the driving sprockets are rectangular in shape as shown at 22 in FIG. 12. In this case the driving face of the teeth 23 on the driving sprocket are flat for engaging the leading flat side of the rectangular holes to drive the belts. By using such cooperating flat surfaces machining is simplified and the necessary accurate positional relationship of the sprocket teeth with respect to the belt holes is more easily obtained. The driving area between the teeth and belts is also greater with the use of such cooperating flat surfaces thereby allowing transmission of higher torque to the belts.

The driving sprocket 95 is supported on a driving shaft 24 in a non-rotatable manner as illustrated in FIG. 8. The driving shaft passes through a tooling plate 25 upon which most of the components of the apparatus 1 are supported. The drive shaft 24 is rotatably driven through an overload clutch 26 in a manner discussed hereinafter. The means 97 for detecting the movement of the moving members is in the form of a shaft encoder connected to the product drive shaft 24 as discussed more fully hereinafter.

Figure 18:
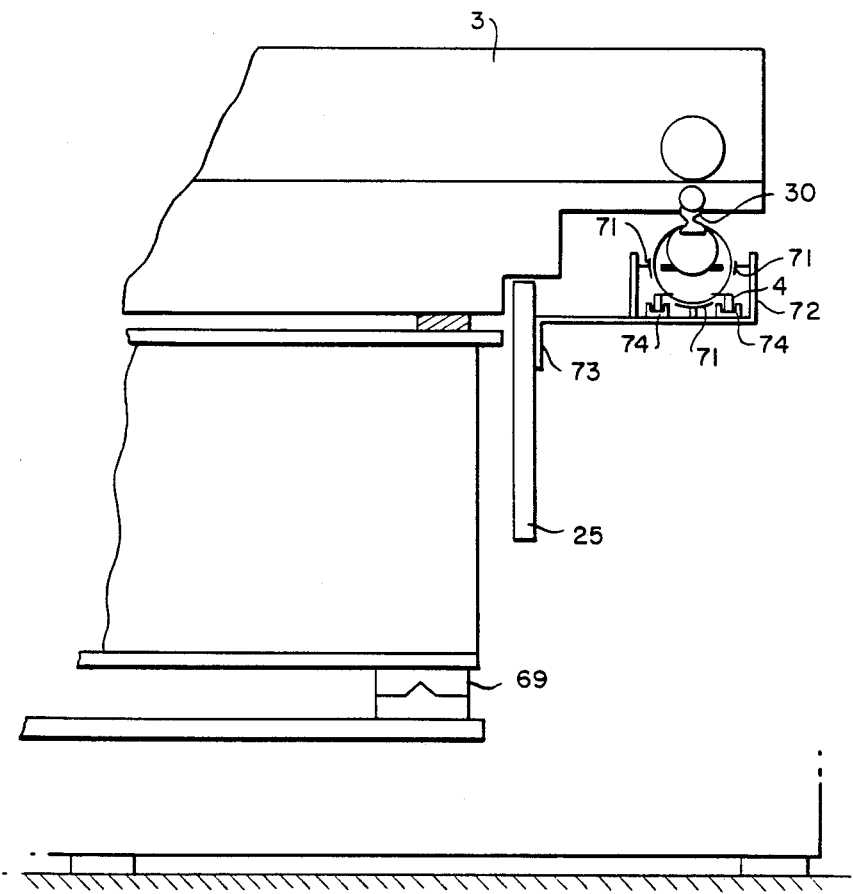
FIG. 18 is a sectional view of the indexer assembly of FIG. 16 taken along the line XVIII—XVIII and illustrating the indexer assembly in relation to the roll former.

The guide rolls 16 and 17 in the upper right of the additional advancing means 7 illustrated in FIG. 2 are rotatably supported in a fixed position by a fixed idler assembly 27. Guide rolls 14 and 15 in the upper left of the additional advancing means 7 are connected to a belt tensioner 28 whose springs 29 resiliently bias the guide rolls in an outward direction to tension the belts 8 and 9. As illustrated in FIG. 2 the guide roll 15 is mounted slightly below and to the right of the guide roll 14 on the belt tensioner 28. The metal belts 8 and 9 are of equal length so that this difference in positional relationship of the guide rolls 14 and 15 permits the guide roll 13 to be positioned slightly below the guide roll 12 in an eccentric idler assembly 29 illustrated in FIG. 2. This results in the belts 8 and 9 being at different heights at the first position 5 or left side of the additional advancing means 7 and converging toward one another gradually along the length of the additional advancing means as they move toward the second position 10 where they are at the same height. Such a spatial relationship of the metal belts takes into account the vertically offset relationship of the opposed edges of the generally tubular shaped sheets of metal as fed from the catch bar 30 of the roll former 3 as shown in FIG. 18.

More particularly, the opposed edges of the generally tubular shaped sheets of material remain in a vertically offset relationhsip as they are advanced through the catch bar 30 into an intermediate Z-bar 31 whose guide channels are vertically offset along the entire length thereof. From the intermediate Z-bar 31 the vertically offset edges of the generally tubular shaped sheets of material 2 are guided into a Z-bar 32 of the type shown in U.S Pat. No. 4,272,004 or U.S. Pat. No. 4,354,090, for example. In the Z-bar 32 the vertically offset guide channels converge toward one another along the length of the Z-bar so that the opposed edges of the metal sheet are brought into overlapping or abutting contact with each other in the area of the laser welding apparatus 6 where they are welded to one another. The Z-bars 31 and 32 are supported on the tooling plate 25 by the Z-bar support assembly 44. The paths of the metal belts 8 and 9 between the guide rolls 12 and 13 at the first position 5 and the drive sprockets 18 and 19 at the second position 10 are essentially parallel to the paths of the respective guided edges of the generally tubular shaped sheets of material 2 from the first position 5 to the second position 10. Therefore, the fingers 11 on the metal belts 8 and 9 remain essentially stationary with respect to the trailing ends of the sheets which they engage so as to reduce or minimize the wear of the fingers 11 and possible canting or deformation of the advancing metal sheets. The fixed idler assembly 27, belt tensioner 28 and eccentric idler assembly 29 are supported on the tooling plate 25 of the apparatus. The configuration of the guide rolls 12–17 can be understood by reference to FIG. 6 wherein the guide rolls 12 and 13 are shown in spaced relationship. Each guide roll is preferably provided with a recess 33 within which a metal belt 8 or 9 is to be received. Two channels 34 are cut into the bottom of each recess 33 for receiving the fasteners, rivets as discussed hereinafter, which connect the metal fingers 11 to the belts.

Respective pairs of guide bars 35–38 are provided under the belts, that is, on the inner side thereof, between the guide rolls and the driving sprocket to support the belts so as to prevent vibrations and vertical movement of the belts while they are driven. The pairs of guide bars 35, 36 and 37 are mounted on L-shaped supporting brackets 39, 40 and 41, respectively which are, in turn, adjustably secured to the tooling plate by suitable fasteners 42 as illustrated in FIG. 2. The pair of guide bars 38 are fastened to a Z-bar support assembly 44 shown in FIGS. 3-5. Each of the guide bars has a supporting surface with two channels formed therein of the type illustrated at 43 in FIGS. 7 and 5 for accommodating the rivets connecting the fingers 11 to the metal belts. The guide bars are preferably formed of a wear resistant material such as a plastic or a metal, for example, aluminum bronze. At least the guide bars 38 are machined in matched sets so as to accurately position the belts 8 and 9 on either side of the Z-bar 32 as shown in FIGS. 4 and 5. The guide bars 37 between the drive sprocket 95 and the adjacent guide rolls 16 and 17 on the downstream side of the drive sprocket include portions 45 which extend to a point immediately adjacent the drive sprocket portions 18 and 19 for stripping the metal belts 8 and 9 off the drive sprocket as they rotate. By forming the guide bars 37, including portions 45, of a wear resistant material, the portions 45 may actually rub against the drive sprocket to strip the belts off the drive sprocket. To minimize the difficulty in separating the metal belts from the drive sprocket, the teeth 20 or 23 on the drive sprocket have a height which is only slightly greater than the belt thickness. As illustrated in FIG. 2, the stripper portions 45 of the guide bars 37 have a knife edge configuration adjacent the driving sprocket which follows the contour of the sprocket.

The continuous metal belts 8 and 9 illustrated in FIGS. 7 and 9-12 are preferably formed from a corrosion resistant stainless steel having a thickness of 0.010 inch and a width of 1.12 to 1.13 inches. A magnetic or a non-magnetic stainless steel may be employed provided the belt material has good flexibility since it must bend around the guide rolls and drive sprocket under tension. During fabrication of the belts, continuous stainless steel strips are punched with holes such as 21 or 22 for receiving the teeth 20 or 23 of the driving sprocket. These holes may be spaced every half-inch along the belt, for example. Similarly, a series of smaller, uniformly spaced holes 46 are also punched on each side of the central holes 21 or 22 for fastening the fingers 11 on the belts. The spacing between the holes 46 is the same as the spacing between the central holes 21 or 22 in the illustrated embodiment but may vary depending upon the length of the generally tubular shaped sheets of metal or can bodies to be advanced by the apparatus. Once the desired holes have been punched in the stainless steel strips the ends of the strips are butt welded as by electron beam or laser welding so as to form continuous metal belts. In the disclosed embodiment the overall length of the belts used with the apparatus is between 70 and 75 inches. While the thickness of the metal belts in the disclosed embodiment is 0.010 inch, the belt thickness may vary from 0.005 to 0.020 inch or more. For strength purposes, it is desirable to use the thickest belt possible, but the minimum bending radius of the belts increases with belt thickness to limit the belt thickness that can be used, considering the fatigue life of the belt.

The fingers 11 mounted on the belts 8 and 9 are connected to respective base plates 47. Connecting means in the form of rivets 48 are provided for connecting the respective base plates to the metal belts as depicted in FIGS. 9 and 11, for example. Two rivets 48 are used to connect each base plate 47 to the metal belt in the illustrated embodiment. The holes 46 for the two rivets 48 are arranged along a line extending perpendicular to the direction of movement of the belts. With this arrangement each base plate 47 is connected to the belts at a single line along the length of the belts which extends in a direction perpendicular to the direction of movement of the belts thereby permitting the belts to travel around the guide rolls and drive sprocket while carrying the base plates with fingers without unduly stressing the belts. The ability of the metal belts to move at high speeds around the guide rolls and driving sprocket is also enhanced by using rivets 48 with rivet caps 49 which are formed with arcuate surfaces 50 in connection with the underside of the belts. The upper or outwardly facing sides of the base plates 47 have recesses 51 formed therein for receiving the tops of the rivets 48.

Each of the base plates 47 for the fingers 11 is machined to within close tolerances to the same predetermined length and thickness before it is riveted to a metal belt. The fingers 11 may be integrally formed with the base plates 47 by machining from a solid wrought material, by casting, or by sintering a powdered material such as a powdered carbide material under pressure. One suitable cast metal that may be employed for the fingers 11 and base plates 47 is NIHARD, a high nickel ferrous alloy. A cast tool steel may also be employed. In the disclosed preferred embodiment the fingers 11 and base plates 47 are formed of investment cast tool steel that is machined and heat treated. This material provides an excellent combination of high strength, wear resistance, ease of manufacturing and relatively low cost.

Figure 13:
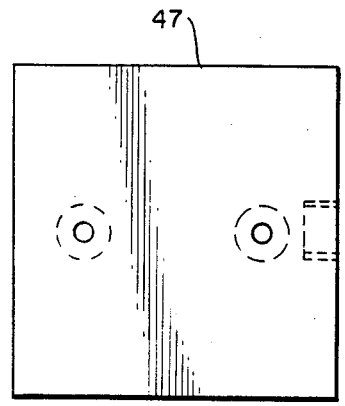
FIG. 13 is a plan view of the bottom or belt engaging surface of a base plate with finger according to the invention.
Figure 14:
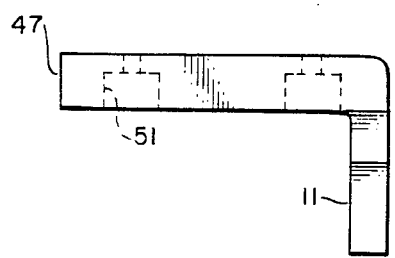
FIG. 14 is a front side view of the base plate with finger illustrated in FIG. 13.
Figure 15:
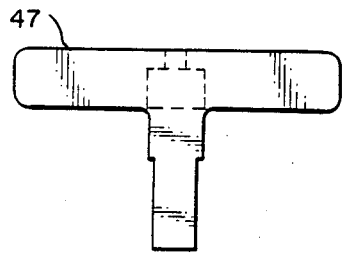
FIG. 15 is a right end view of the base plate with finger as shown in FIG. 14.

Instead of forming the metal fingers 11 integral with the base plates 47 as shown in FIGS. 13-15, the metal fingers 11 may be separately formed and connected to the base plates by brazing, for example. The fingers themselves may also be formed of a composite material including a material sheet contacting portion of a ceramic material and an adjacent portion of metal, for example. The two portions may be glued or brazed together to form a single finger. A finger having a ceramic portion which contacts the generally tubular shaped sheets of material is particularly advantageous where it is desired to electrically insulate the additional advancing means 7 from the material sheet in the case the sheet material is a conductive material. However, with laser welding, metal fingers are preferable as compared with ceramic fingers because they reflect light better.

In addition to the pairs of guide bars 35-38 provided adjacent the bottom or innerside of the metal belts for supporting the belts during their movement, an additional pair of guide bars 52 are provided for supporting the outer surfaces of the base plates 47 as they advance the generally tubular shaped metal bodies 2 between the first position 5 and the second position 10. The pair of guide bars 52 are illustrated in FIGS. 2, 4 and 5. The guide bars 52 are attached to the pair of guide bars 38 which in turn are carried by the Z-bar support assembly 44 mounted on the tooling plate 25. The guide bars 52 are preferably formed of a wear resistant material such as aluminum bronze. Together the guide bars 38 and guide bars 52 define channels 53 within which the metal belts and base plates 47 are closely confined. The channels 53 are sufficiently large to permit the longitudinal movement of the belts but limit the canting or tilting of the base plates 47 which may occur about the connection line formed by the rivets 48 between the base plates and the metal belts as a result of the forces on the fingers 11 during movement of the generally tubular shaped material sheets 2. Any canting or tilting of the base plates 47 on the belts about the rivets 48 necessarily changes the longitudinal position of the fingers 11. However, by match machining the dimensions of the guide bars 38, guide bars 52 and the length and thickness of the base plates 47, the permissible tilting or canting of the base plates is the same so that there will be no misalignment introduced as a result of this arrangement. Further, to ensure that the edges of the sheet metal to be welded are precisely longitudinally aligned with respect to each other, the surfaces of the fingers 11 on the belts which cooperate to engage the trailing end of a generally tubular shaped sheet of metal and advance the same are match machined with respect to each other either before or after the base plates thereof have been connected on the belts.

Figure 16:
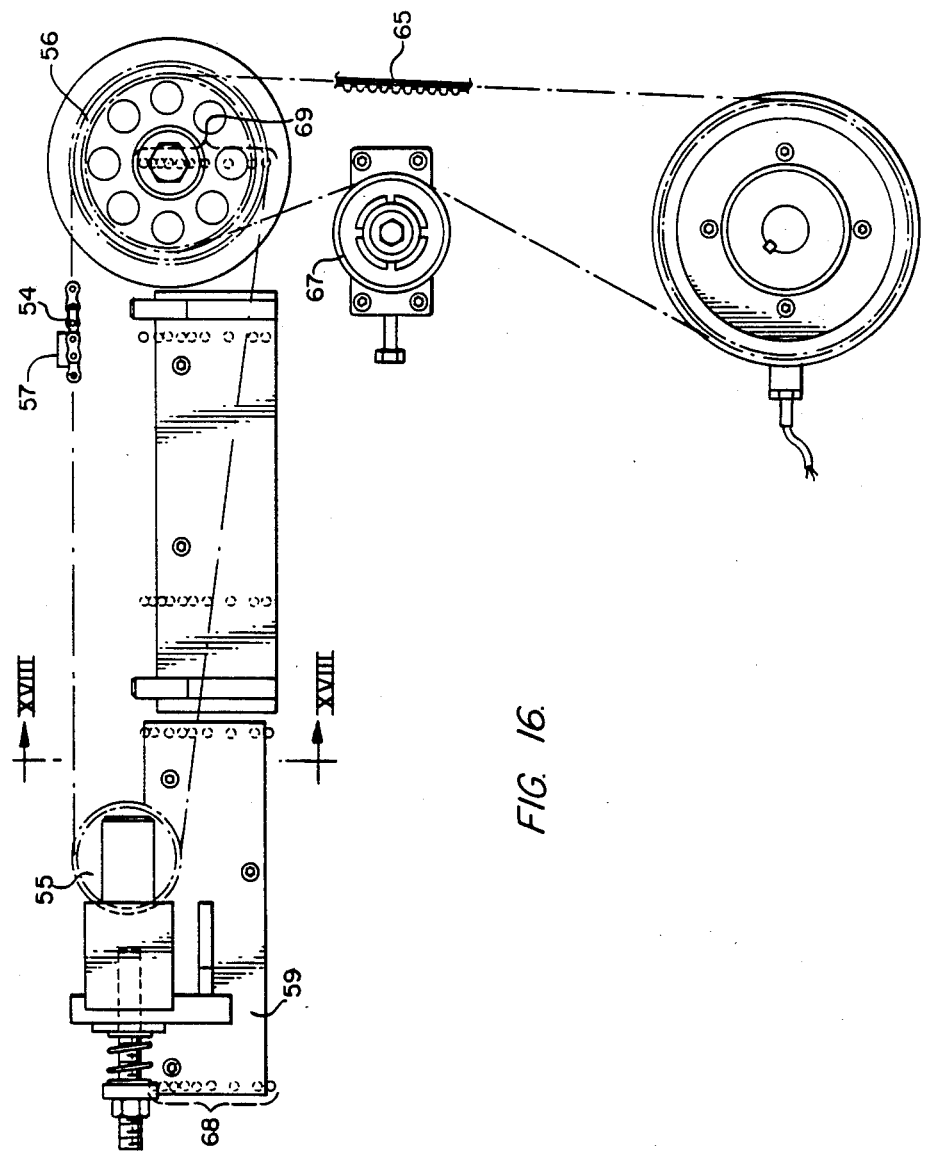
FIG. 16 is a front side view of the indexer assembly illustrated schematically in FIG. 1.
Figure 17:
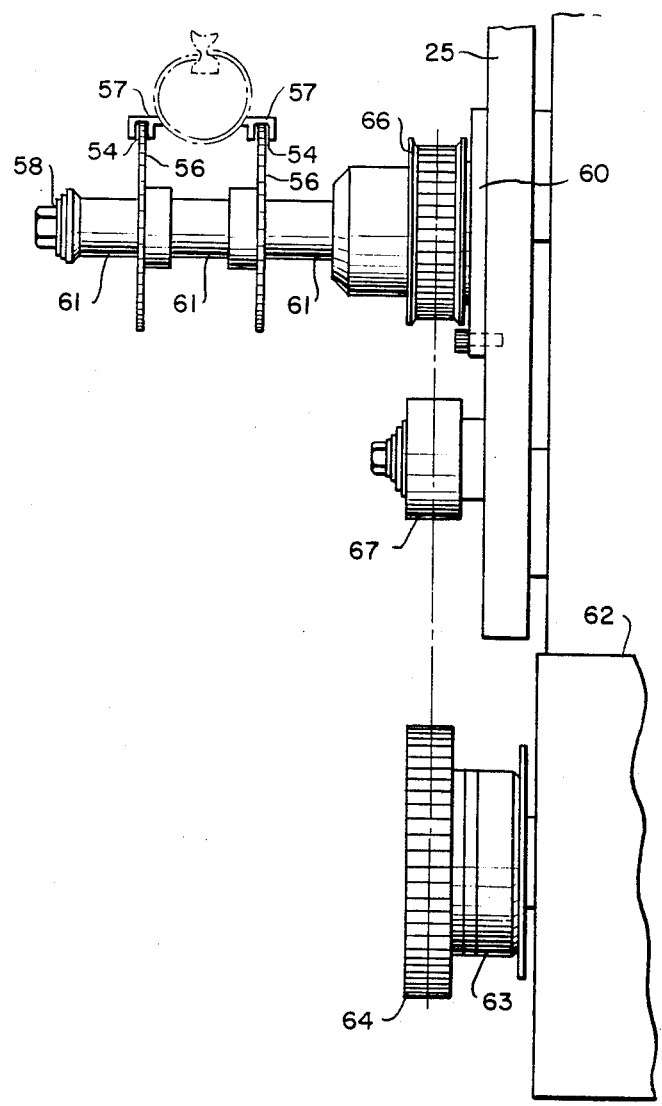
FIG. 17 is a right end view of the indexer assembly shown in FIG. 16.

The advancing means 4 for successively advancing the generally tubular shaped sheets of material 2 from the roll former 3 to the first position 5 in a direction toward the laser welding apparatus 6 comprises a pair of chains 54 extending between the roll former and the first position about respective pairs of sprockets 55 and 56 as illustrated in FIGS. 16 and 17. Each of the endless chains 54 has a plurality of fingers 57, three fingers in the disclosed embodiment as shown in FIG. 1, mounted thereon for engaging the respective trailing ends of successively generally tubular shaped sheets of metal to advance the sheets. Each of the pairs of sprockets 55 and 56 are supported on a shaft of the type illustrated at 58 in FIG. 17. The assemblies of the shafts and sprockets 55 and 56 are respectively supported from the tooling plate 25 by means of support brackets 59 and 60. The sprockets 55 and 56 are spaced apart on the respective shafts 58 by means of spacers 61 so that the chains 54 are positioned on opposite sides of the generally tubular shaped sheets of material 2. The sprockets 55 for the chains 54 are idler sprockets and the sprockets 56 act as drive sprockets. The sprockets 56 are nonrotatably connected to the shaft 58 which in turn is driven by the output of an indexer 62 through an overload clutch 63, sprocket 64, toothed belt 65 and sprocket 66 connected to the shaft 58. A takeup roller 67 is provided to tension the belt 65.

A series of vertically aligned, spaced apart holes such as those shown at 68 and 69 are provided in the tooling plate 25 to adjust the position of the idler sprockets 55 and drive sprockets 56 upward and downward with respect to the catch bar, 30 of the roll former to accommodate different sizes of generally tubular shaped sheets of material. The distance between respective idler sprockets 55 and between respective drive sprockets 56 can be adjusted by changing the size of the spacers 61. The roll former 3 is mounted on a subframe of the machine on slides 69 which permit adjustment of the position of the roll former in the direction of the movement of the generally tubular shaped sheets of material 2. Thus, with different lengths of sheet material, the roll former can be adjusted with respect to the advancing means 4 so that the trailing ends of the sheets are always positioned at the same point 70 along the advancing means.

These features of the present invention are particularly advantageous in that they permit the apparatus to continuously form and weld can bodies for the full range of sizes of three-piece cans recognized by the Can Manufacturers Institute. That is, can bodies can be formed and welded with can diameters ranging from 1 12/16 to 6 10/16 inches and with can lengths or heights ranging of from 2 14/16 or shorter to 7 inches in the case of sanitary cans for food or pharmaceuticals, for example. The apparatus is also useful for forming and welding a full range of standard aerosol cans which may be relatively small in diameter yet as tall as 9 8/16 inches.

The generally tubular shaped sheets of material 2 are formed from flat sheets of metal, for example, having a thickness of 0.008 inch by the roll former 3 and delivered to the catch bar 30 of the roll former immediately over the advancing means 4 as illustrated in FIG. 18. In this position the generally cylindrical sheets of metal 2 are supported and guided by dish-shaped elements 71 extending beneath and along the sides of the metal sheet 2. The elements 71 are supported in a frame 72 shown schematically in FIG. 18 which, in turn, is carried by a support bracket 73 attached to the tooling plate 25. The frame 72 also supports guides 74 for the chains 54. In this position the fingers 57 on the chains 54 engage the lower portions of the sheet metal 2 on opposite sides thereof while the upper edges of the sheet metal are guided in the catch bar 30. As the sheet metal is advanced in the direction of the laser welding apparatus 6, the opposed edges are successively guided by the intermediate Z-bar 31 and the Z-bar 32 to the point of welding as discussed above. The frame 72 and the elements 71 therein extend along the apparatus in the direction of the laser welding apparatus to support and guide the sheets 2 from the roll former 3 up to a point adjacent the Z-bar 32 and an additional frame 93. The frame 93 contains a plurality of sets of support rollers 94 as shown in FIG. 5 spaced along the length of the frame 93 for supporting and guiding the sheets 2 so that the opposed edges thereof remain positioned in the guide channels of the Z-bar 32 as they are advanced by the additional advancing means 7.

Figure 19:
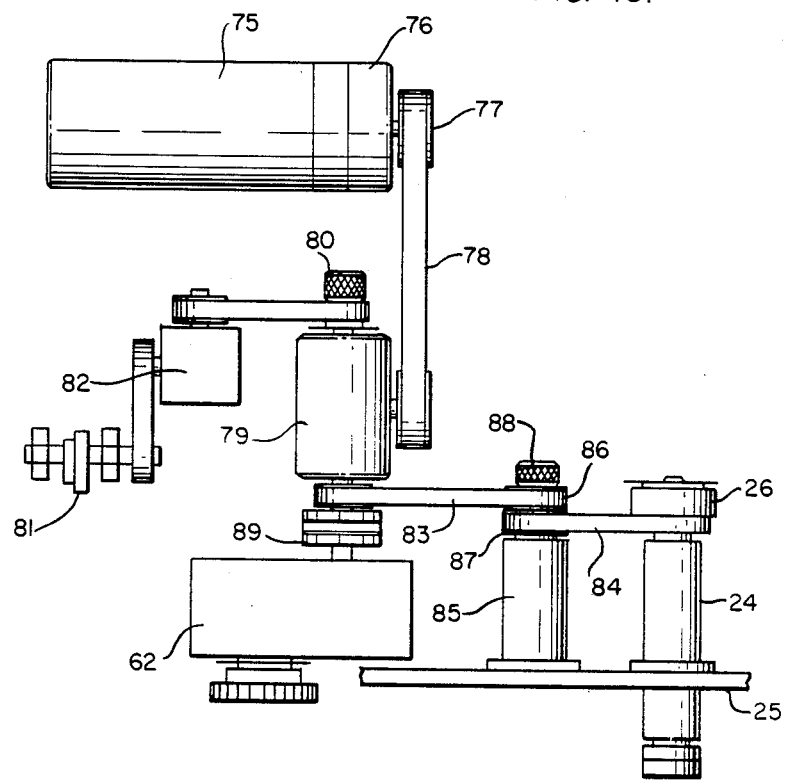
FIG. 19 is a schematic diagram of a drive for the apparatus according to the invention.

A single drive motor 75 shown in FIG. 19 is used to operate the apparatus 1. The drive motor is a variable speed motor which is connected through a clutch/brake 76 to a driving sprocket 77 to a toothed belt 78. The belt 78 drives the input of a speed reducing gearbox 79. The output from one side of the gearbox 79 is connected to the roll former eccentric 81 by way of a gearbox 82. A phase adjustor 80 is provided at this output of the gearbox 79. The output from the other side of the gearbox 79 is coupled, on the one hand, to the driveshaft 24 for the metal belts 8 and 9 by way of overload clutch 26, toothed belt 84, sprockets 86 and 87 on idler shaft 85, phase adjustor 88 and toothed belt 83 as illustrated in FIG. 19. On the other hand, this second output of the gearbox 79 is connected to the indexer 62 by way of a flexible coupling 89. The phase adjustor 80 permits the operation of the roll former eccentric to be adjusted with respect to the advancing means 4 so that a generally tubular shaped sheet of metal arrives at the catch bar 30 with its trailing end at point 70 in with its trailing end at point 70 in advance of the fingers 57 on the chains 54 which are to advance the metal sheet. Similarly, the phase adjustor 88 permits coordination between the position of the fingers 11 on the metal belts 8 and 9 and the fingers 57 on the chains 54 so that when the fingers 57 advance the trailing ends of the can bodies 2 to the first position 5, a pair of fingers 11 are just slightly upstream of this position 5 so that they move into contact with the upper portion of the generally tubular shaped sheet of metal while it is still moving to continue to advance the same toward the laser welding apparatus.

Figure 21:
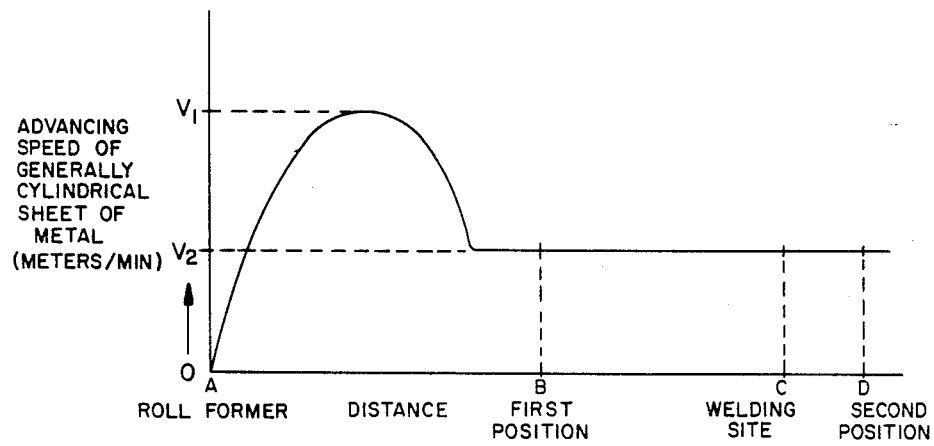
FIG. 21 is a graph showing the speed of a generally tubular shaped sheet of metal as it is moved along the apparatus of FIG. 1.

This movement is illustrated in FIG. 21 wherein the speed of a generally tubular shaped sheet of metal 2 is shown as a function of its distance of travel along the apparatus from the roll former 3 identified as point A, through first position 5 indicated by B, welding site C and second position 10 denoted by D. From the roll former 3 at position A the advancing means 4 accelerates the sheet metal 2 to a relatively high velocity $V_1$ over a short distance and then decelerates the sheet metal to a lower, substantially constant velocity $V_2$ as the sheet metal approaches the first position B. The metal belts 8 and 9 are moving at a speed $V_2$, such as 60 meters/minute, and the position of the fingers 11 thereon is coordinated with respect to the operation of the indexer 62 so that the fingers 11 arrive just after the trailing ends of the sheets of metal reach the position B so that the sheets are continuously advanced further along the apparatus at the speed $V_2$ through the welding station C to the second position 10 at D. From this point a conventional conveyor can be used to further process the welded can bodies. The high velocity $V_1$ during a portion of the travel of the sheet of metal 2 from the roll former 3 to the first position 5 identified as B in Figure 21 is employed to reduce the spacing between successive sheets of metal 2 to a predetermined, small distance to enhance the production efficiency of the apparatus. The longitudinal spacing of the fingers along the respective belts 8 and 9 is dictated by the amount of this predetermined clearance and the height or length of the metal sheets 2.

Figure 20:
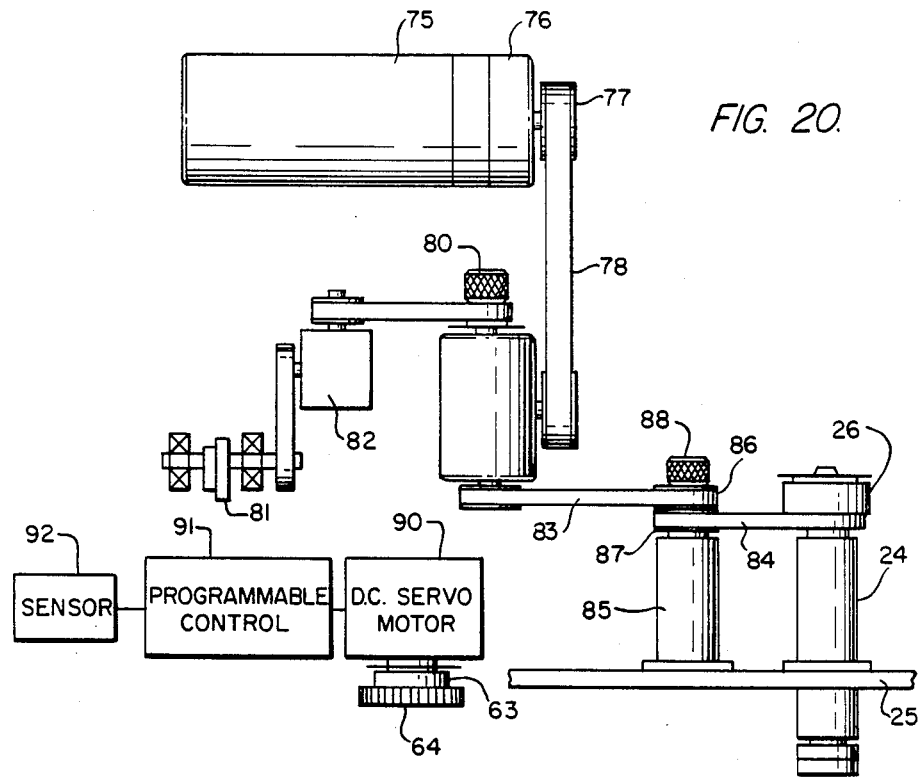
FIG. 20 is a schematic diagram of a drive similar to that shown in FIG. 19 but with the use of a D. C. servomotor in place of a cam operated indexer.

The indexer 62 is a cam type indexer. The velocity characteristic of this type of indexer is controlled by the shape of a cam. This necessitates changing cams if different velocity characteristics are desired. The time and expense associated with stocking a plurality of cams and changing the cams in such an indexer to vary the velocity characteristic can be avoided according to the form of the invention illustrated in FIG. 20 wherein the drive is similar to that illustrated in FIG. 19 except that a D.C. servomotor 90 is used as the indexer. A programable control 91 is provided for the D. C. servomotor 90 to permit a wide variation of the characteristics for indexing. Coordination between the advancing means 4 and the additional advancing means 7 can be obtained in this case by using a sensor 92 such as a light source and cooperating photocell to sense the position of the fingers 11 on the metal belts 8 at a predetermined location. With this information the D. C. servomotor 90 can be actuated by the control 91 at the appropriate time for coordinated movement.

The pulsed laser welding apparatus 6 is preferably an electronically pulsed gas laser such as a 2 KW $CO_2$ laser wherein the high voltage to the laser discharge tubes is switched on and off at frequencies up to 10,000 Hertz to provide intermittent, microsecond duration pulses of laser energy of the type illustrated in FIG. 25. At 10,000 Hz the pulse duration is maybe 65 microseconds. Alternatively, the laser pulses could be produced by chopping or interrupting a continuous laser beam. The average energy density of the laser pulses is at least $10^6$ watts/inch$^2$. The laser 6 is switched on and off or fired in response to a first output signal from the control means 98. A second output signal from the control means 98 is used to control the current of the laser discharge tubes hence the power of the laser pulses to adjust the energy for welding per unit length of a member in response to the detected movement of the member. The control means 98 is illustrated schematically in FIG. 28 and discussed more fully hereinafter.

Figure 27:
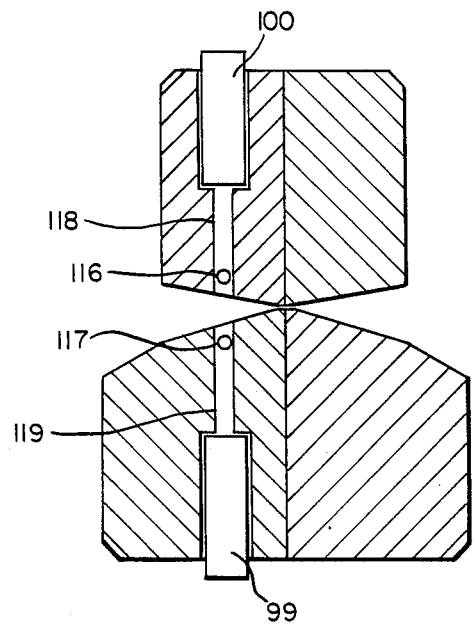
FIG. 27 is a cross sectional view of the Z-bar of the disclosed apparatus taken along the line XXVII—XXVII of FIG. 26.

The movement of the generally cylindrically shaped sheets of metal 2 is detected in the vicinity of the pulsed laser welding apparatus 6 by the detector 96 which includes a photosensor 99 such as a photodiode having an electrical output sensitive to the amount of light striking it. The photosensor receives light from a light emitting diode 100. Both the photosensor and light emitting diode are positioned in opposed relationship across the path of movement of the members 2 and within recesses in the Z-bar just upstream of the laser welding apparatus 6, for example approximately 1 ½ inches forward of the welding site so that vapors during welding do not obscure or interfere with the detection of the can bodies. When the light beam to the photosensor 100 is interrupted by the leading edge of a generally cylindrically sheet of metal 2 as it is moved at high speed toward the laser welding apparatus, the signal from the photosensor is received by the control means 98. Likewise, when the trailing edge of the member 2 passes the photosensor, light from the LED 100 is again received by the photosensor 99 and a signal received at the control means 98. To protect the light emitting diode 100 and photosensor 99 from vapors in the weld area, the Z-bar guide 32 is provided with gas passages 116, 117 for transmitting gas from a source (not shown) to the light passages or recesses 118, 119 within the Z-bar shown in FIGS. 26 and 27.

Figure 29:
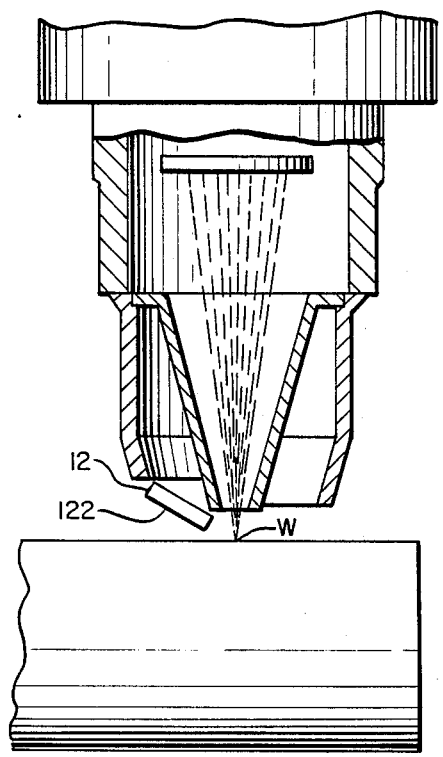
FIG. 29 is a schematic front side view of the apparatus of the invention with another arrangement for detecting the leading and trailing ends of the moving can bodies wherein the means for detecting the leading and trailing ends of the moving can bodies is located in the vicinity of the laser welding area.

Alternatively, the photosensor 99 and LED 100 could be omitted and a photosensor 122 provided adjacent the welding site to detect the light from the weld plasma as shown schematically in FIG. 29 of the drawings. Where the laser continues to be pulsed after the trailing ends of the can bodies are advanced past the welding site beneath the focussed laser beam and pulsed before the leading edges of the can bodies arrive at the welding site, the photosensor 122 can be used to detect the position of the respective ends at the welding site or welding means because a weld plasma is generated or extinguished almost instantaneously with the arrival or departure of the ends of the can bodies beneath the laser. That is, a weld plasma, and bright light associated therewith are generated almost instantaneously with the impingement of the laser beam on the can body end and are extinguished almost instantaneously with the departure of a can body end from beneath the laser beam. Thus, with this arrangement a light source such as a light emitting diode 100 is not necessary and the movement of the can body can be detected at the welding site or welding means instead of upstream thereof as in the arrangement of FIGS. 26 and 27.

The means for detecting the movement of the sheets of metal 2 further comprises means 97 in the form of a shaft encoder for continuously detecting the position of a moving member as it moves past the pulsed laser welding apparatus. The shaft encoder 97 is connected to the drive shaft 24 for the drive sprocket 95. The encoder provides an output signal or pulse for each, predetermined small increment of rotation at the shaft which corresponds to an increment of translation, for example one pulse per 0.001 inch movement of the can body in the vicinity of the laser welding apparatus 6. The output of the encoder is also received by the control means 98. Since the distance between the photosensor and the position of the focused laser pulses is known, by counting the pulses from the time the leading and trailing edges of a member are detected by the photosensor, initiation of laser firing or pulsing can be accurately controlled with respect to both the leading and trailing edges of the member. Of course, where the edges are detected at the welding site as in FIG. 29, no delay is required. These signals received by the control means 98 are processed by a circuit for controlling the power level of the laser pulses in a predetermined manner with respect to the position of on the can body being welded That is, the signals from the encoder are used to drive a digital-to-analog converter to control the ramp slope and duration. The output voltage of the converter is used to control the current of the laser discharge tubes hence the power of the laser pulses. By controlling the laser pulsing in relation to the position of the can, speed variations of the member being welded, both as a result of short term variations of speed with the machine itself and also intentional changes in the operating speed of the machine, are automatically taken into account by the control means 98 to maintain the desired pulse pitch and power profile along the length of a member. Further, with minor variations in the length of a member being welded, welding is nevertheless initiated and terminated in a highly accurate manner with respect to the ends of the member being welded because the control for initiating and terminating welding is specific with respect to each can being welded. This affords accurate control for the ramp or slope-in and ramp or slope-out of the power at the leading and trailing ends of a can body being welded.

Figure 28:
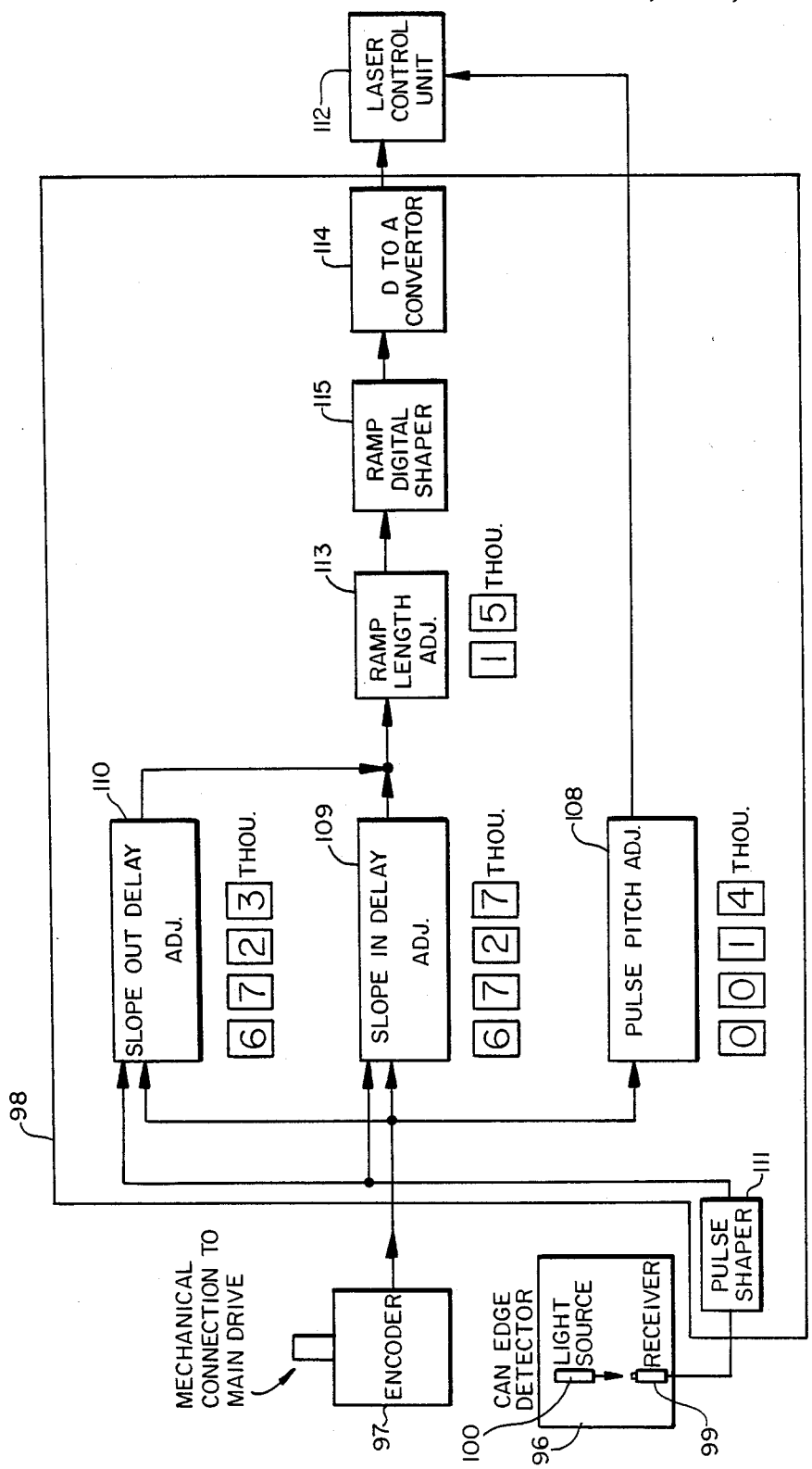
FIG. 28 is a schematic block diagram of the control means of the apparatus of FIG. 1 for controlling the pulsed laser welder in response to the detected movement of the tubular shaped sheets of metal.

Referring now to FIG. 28, it is seen that the control of the laser power output level is achieved by the control circuit indicated by the numeral 98. This control means or circuit is coupled to receive pulses from the encoder 97 and the can edge detector 96, and to utilize these pulses to control the laser output power level to have a waveform such as shown in Figure 25. The encoder 97 is coupled to the system main drive shaft 24 to produce pulses which precisely indicate the position of the main drive shaft. The can edge detector 96 produces pulses which indicate the leading and trailing edges of each can. As illustrated, this can edge detector is a light sensing system in which the passage of a can is determined by the interruption or passage of light between the light source 100 and the light receiver 99. Of course, other appropriate edge detectors could also be used if desired.

In the embodiment shown, the control circuit 98 comprises a pulse pitch adjuster 108, a slope-in delay adjuster 109 and a slope-out delay adjuster 110, which are all coupled to receive the output pulses of the encoder. The slope-in delay adjuster and the slope-out delay adjuster also receive the output signals from the can edge detector through a pulse shaper 111.

The output of the pulse pitch adjuster 108 is coupled directly to the laser control unit 112 of laser 6 to continuously produce pulses for activating the laser at a predetermined pulse pitch which is based on the distance traveled by the can. In other words, the pulse pitch adjuster functions as a resettable counter which produces an output to activate or fire the laser control unit to produce a laser pulse every time the encoder count reaches a certain value. Thus, if the encoder is set to produce a pulse for every 0.001 inch of shaft movement, the pulse pitch adjuster can be set at any desired value to produce an output every time a certain number of pulses is counted from the encoder. Since the encoder output is directly related to the movement of the can, the laser pulse pitch will also be determined by the amount of can movement. For example, if the pulse pitch adjuster is set to produce an activating output every time it counts fourteen (14) pulses from the encoder, then a laser pulse will be produced every time a can is moved 0.014 inch. Accordingly, the laser pulse pitch is completely independent of time, and depends, instead, on the actual amount of can movement.

According to the preferred embodiment, the laser will be on at all times, and will, accordingly, continuously be producing laser output pulses through the operation of the encoder and the pulse pitch adjuster discussed above. However, the amplitude of these laser output pulses will vary, depending upon the precise can position at any given time. Thus, as shown in FIG. 24, when a can leading edge $D_1$ reaches the area of the focused laser pulse, the amplitude level of the laser power $P_1$ is relatively low. As the sensed can progresses from this point, the laser output power will be increased over the distance $D_1$ to $D_2$ to provide a higher power level $P_2$ as previously discussed. Subsequently, at the distance $D_3-D_4$ from the sensed trailing edge of the can, the laser power will again be decreased to power level $P_3$. The operation will then recycle as the leading edge of the next can is detected. In this way successive can bodies can be welded at high speed. The increasing and decreasing of the power of the laser pulses is controlled by the slope-in delay adjuster 109, the slope-out delay adjuster 110, a ramp length adjuster 113 and a digital-to-analog converter 114, which are coupled to the laser control unit 112.

Specifically, in operation, when the can leading edge is sensed, an activating pulse is applied to the slope-in delay adjuster 109 through the pulse shaping circuit 111. The pulse shaping circuit 111 can be any conventional unit for forming the sometimes irregularly shaped pulses from the light receiver 99 into the well formed pulses desired for activating the slope-in delay adjuster 109 and the slope-out delay adjuster 11. The slope-in delay adjuster is preferably a counter which will be reset to begin its count upon receipt of the can leading edge signal. The slope-in delay adjuster then counts pulses from the encoder up to a predetermined level before producing an output which will bring about a change in the laser power level. For example, the slope-in delay adjuster could be set to count 6,727 pulses from the encoder (corresponding to 6.727 inches based on the prior assumption of 1 pulse per every 0.001 inch) before producing an output to the ramp length adjuster 113. If this were done, the power would begin to increase exactly when the can had moved 6.727 inches from the point where the leading can edge was first sensed. In this last mentioned position the leading edge of the can is at the location beneath the laser apparatus 6 where the pulsed laser beam is focused. Thus, welding begins at the leading edge at this point. Accordingly, it can be said that increasing the power of the laser pulses is also dependent upon can movement rather than upon time.

In the preferred digital implementation shown, the output of the slope-in delay adjuster 109 will activate the ramp length adjuster 113, as noted above. This ramp length adjuster can also be a counting circuit which will count encoder pulses passed to it through the slope-in delay adjuster after the slope-in delay adjuster has exceeded its predetermined delay count (e.g., 6,727 in the example given above). The output of the ramp length adjuster is a cumulative digital count value which increases every time the can moves sufficiently to produce one encoder pulse after the delay count of the slope-in adjuster has been exceeded, and until such time as a maximum preset ramp length adjusting count is reached. This cumulative count is passed to the digital-to-analog converter 114 through a ramp digital shaper 115 (which shapes the pulses to provide a clearly recognized digital input to the digital-to-analog converter). The digital-to-analog converter produces an analog output voltage which is dependent upon the present count value from the ramp length adjuster. Thus, as an example of operation, if the ramp length adjuster 113 is set to count fifteen encoder pulses after the slope-in delay adjuster has exceeded its delay count, the laser output power ramp will go from its low laser level $P_1$ to its high laser level $P_2$ over a span of 0.015 inch movement of the can. As this occurs, the cumulative output of the ramp length adjuster will, for each count, increase the output analog voltage from the digital-to-analog converter until a maximum output is reached after the ramp length adjuster has counted its fifteenth encoder pulse. Thus, the actual ramp length of the laser power increase will also be dependent upon the can movement rather than upon time.

Although the ramp length adjuster 113 controls the ramp length and gradually increases the analog voltage output of the digital-to-analog converter, as discussed above, the actual value of the analog voltage is preferably set by a power supply in the digital-to-analog converter itself. Thus, for any given count value received from the ramp length adjuster, the corresponding analog output value of the digital-to-analog converter will be determined by the analog value given to this count by the digital-to-analog converter itself. Accordingly, the ramp length and the actual laser output power produced along the ramp can be separately controlled.

From the above description, it can be seen how the laser power is increased from its low level $P_1$ at a time when the can leading edge is sensed to a higher level $P_2$ at a subsequent point of time when a high laser output level is necessary for welding. The laser output will remain at the high level after the ramp length adjuster has reached its maximum count until such time as the slope-out delay adjuster 110 begins operation to decrease the laser output level t.

The slope-out delay adjuster 110 works in a related manner to the slope-in delay adjuster 109 to begin lowering the laser output level at a predetermined time after the trailing edge of the can is sensed. Specifically, the slope-out delay adjuster is reset when the trailing edge of the can is sensed by the can edge detector 96 to begin a delay count to a predetermined number. After the predetermined number is reached, an activating output is produced for coupling to the ramp length adjuster 113. However, unlike the slope-in delay adjuster, the slope-out delay adjuster will activate the ramp length adjuster to count downwards (i.e., to decrement it) to reduce the digital cumulative count output from the ramp length adjuster every time the encoder produces an output pulse following the preset delay in the slope-out delay adjuster. Therefore, in operation, it is preferred that the ramp length adjuster be an up-down counter. In any event, as the cumulative count from the ramp length adjuster decreases, the analog output of the digital-to-analog converter will decrease to lower the laser pulse power.

If desired, the ramp length adjuster can be decreased to the same level over the same ramp distance of can movement by the slope-out delay adjuster as was done for increasing the level by the slope-in delay adjuster (e.g., with a ramp length of 0.015 inch, as discussed previously). On the other hand, it can obviously be arranged for the ramp length adjuster to change the ramp length if desired by decrementing the ramp length adjuster count to a different value than that at which the slope-in ramp began. This, correspondingly, would produce a different voltage output from the digital-to-analog converter at the end of the slope-out period than was found at the beginning of the slope-in period. This permits three actual levels at times other than the ramp periods, and this is sometimes more desirable than simply operating with only a high or low laser power level as discussed with reference to Fig. 24, for example. Of course, if this is done, return to the proper level prior to the next increasing ramp period is required at some time between the end of the decreasing ramp period and the beginning of the next increasing ramp period. This return can be done through an additional circuit coupled to receive the encoder output to indicate a predetermined point in the main shaft position at which the return is desired, for example, the shaft position corresponding to a location at or immediately preceding the arrival of the can leading edge beneath the pulsed laser beam.

A major advantage of the system described above is that it permits an extremely accurate control of the laser pulse power based on the can position. Further, the system is readily adjustable for changing the laser pulse pitch, the point of can movement at which power is increased and decreased, the actual ramp distance for the increase and decrease, and the actual laser pulse power amplitude. In addition, these adjustments can actually be carried out independently of one another to tailor the laser output power to meet different welding needs.

Although the above control circuit has been described with regard to the circuit illustrated in FIG. 28, it is to be understood that other circuit arrangements could be used. For example, if desired, a microprocessor or other type of computer could be programmed to achieve the same control of the laser control unit 112 based on a sensed encoder output pulses and the can edge detector output, as was accomplished by the circuit illustrated for the control circuit in FIG. 28. Also, although the preferred embodiment discussed above keeps the laser on at all times to produce a pulsed output, it is, of course, possible to completely stop the laser pulses at intervals between the cans if this is desired.

The high speed movement of the member during welding, 30 m/min. for example, causes the individual welds formed by the laser pulses to be teardrop shaped having, for example, a width of 0.006 inch and a length of 0.018 inch. To provide a fifty percent overlap of the welds and therefore a continuous welded seam along the entire length of the member, the laser must be fired to provide a pulse of laser energy every 0.009 inch. To accomplish this, the pulse pitch adjuster 108 of the control means 98 is set to count the pulses and fire the laser every 9 pulses, corresponding to 0.009 inch of movement, after which the pulse counter is reset to begin counting again. The ramp length for slope-in and slope-out at the ends of the member and the welding power levels are also preset as described.

Thus, with the control means of the invention accurate control of the pitch of the individual spot welds, the length of the slope-in and slope-out, the position of initiation of slope-in and slope-out, and the power of the pulses with respect to the position of the member being welded, is possible, all independent of machine speed. This permits the precise control of the heat input per unit length of the member being welded to avoid or minimize heat input related weld defects and makes possible the high speed laser welding of members with consistently high quality welds. Sound welds have been made according to the invention at speeds of 40 m/min. and higher.

While I have shown and described only one embodiment in accordance with the present invention, it is understood that the same is not limited thereto, but is susceptable to numerous changes and modifications as known to those skilled in the art. For example, the method and apparatus of the invention are not limited to welding can bodies or even generally cylindrically shaped members but may be used to form welds in other members such as flat strips of materials, etc. Likewise, the invention is applicable for forming welds in joint configurations other than butt such as lap, groove or surface welds. Further, while the pulsed high energy density welding method and apparatus is a laser welding method and apparatus, other pulsed high energy density techniques such as pulsed electron beam welding, etc. could be used with the method and apparatus of the invention. Therefore, I do not wish to be limited to the details shown and described herein, but intend to cover all such changes and modifications as are encompassed by the scope of the appended claims.

I claim:

1. A method of forming a continuous weld at high speed comprising the steps of moving a member to be welded at high speed relative to a pulsed high energy density welding means capable of producing a plurality of short duration pulses of energy having an average power density of at least $10^6$ watts/inch$^2$, forming a continuous weld along said member with a plurality of overlapping welds formed by applying a plurality of short duration pulses of high density energy from said pulses high energy density welding means to said member, detecting the movement of said moving member in the vicinity of said welding means and controlling the pulsing of said pulsed high energy density welding means during said welding in response to the detected movement of said moving member so that the energy for welding from the pulses per unit length of the member is accurately controlled.

2. A method of welding according to claim 1, wherein said high energy density welding means is a pulsed laser welding means.

3. A method of welding according to claim 2, wherein the pulsing of the laser welding means is controlled in response to changes in the detected movement of the member so that the pitch of the plurality of overlapping welds along said member is substantially constant.

4. A method of welding according to claim 1, wherein said member is moved relative to the pulsed high energy density welding means at a speed of at least 22 m/min.

5. A method of welding according to claim 1, wherein said member is a thin metal member having a nonmetallic coating in the area to be welded, said nonmetallic coating being vaporized during welding.

6. A method of welding according to claim 5, wherein the pulses of energy each include a relatively high peak of power at the beginning thereof which vaporizes said nonmetallic coating and aids absorption of the welding energy by said member.

7. A method of welding according to claim 1, wherein said step of detecting the movement of said moving member includes detecting the leading edge of said moving member at or upstream of said pulsed high energy density welding means and continuously detecting the position of said moving member in the vicinity of the welding means after said leading edge has been detected.

8. A method of welding according to claim 7, wherein said step of detecting the movement of said moving member further includes detecting the trailing edge of said moving member at or upstream of said pulsed high energy density welding means.

9. A method of welding according to claim 1, wherein said step of controlling the pulsed high energy density welding means includes adjusting the power of the pulses in a predetermined manner in response to the detected movement of said moving member.

10. A method of welding according to claim 1, wherein said step of controlling the pulsed high energy density welding means includes initiating said welding of said member at a first relatively low power level and then increasing the power level to a second relatively higher power level at a predetermined distance along said weld.

11. A method of welding according to claim 10, wherein said step of controlling the pulsed high energy density welding means includes decreasing the power from said second relatively higher power level to a third relatively lower power level at a predetermined distance from the end of said weld.

12. Apparatus for forming a continuous weld along a member at high speed with a plurality of overlapping welds formed by pulses of energy having an average power density of at least $10^6$ watts/inch$^2$ comprising a pulsed high energy density welding means for producing a plurality of short duration pulses of energy having an average power density of at least $10^6$ watts/inch$^2$, means for moving a member to be welded at high speed relative to the pulsed high energy density welding means, means for detecting the movement of said moving member in the vicinity of said welding means, and control means for controlling the pulsing of the pulsed high energy density welding means in response to the detected movement of said moving member so that the energy for welding from the pulses per unit length of the member is accurately controlled.

13. An apparatus for forming a continuous weld according to claim 12, wherein said pulsed high energy density welding means is a pulsed laser welding means.

14. An apparatus for forming a continuous weld according to claim 12, wherein said pulsed high energy density welding means provides pulses of energy which have a relatively high peak of power at the beginning thereof.

15. An apparatus for forming a continuous weld according to claim 12, wherein said means for detecting the movement of said moving member detects the leading edge of the moving member at or upstream of the pulsed high energy density welding means and continuously detects the position of the moving member as it moves past said pulsed high energy density welding means.

16. An apparatus for forming a continuous weld according to claim 15, wherein said means for continuously detecting the position of the moving member includes an encoder connected to said means for moving said member, the output of said encoder being provided to said means for controlling the pulsed high energy density welding means.

17. An apparatus for forming a continuous weld according to claim 16, wherein said control means includes a digital-to-analog converter which is driven by the output of said encoder to control the power level of said pulsed high energy density welding means.

18. An apparatus for forming a continuous weld according to claim 12, wherein said control means controls the power of the pulses from said pulsed high energy density welding means.

19. An apparatus for forming a continuous weld according to claim 12, wherein said member is a generally cylindrically shaped member whose adjacent longitudinally extending edges are to be welded to form a can body or the like, a Z-bar guide being provided for guiding said edges into position for welding as the member is moved at high speed in the direction of the pulsed high energy density welding means.

20. An apparatus for forming a continuous weld according to claim 19, wherein said means for detecting the movement of said member includes a detector located in said Z-bar guide upstream of said welding means for detecting the leading and trailing edges of said moving member.

21. A method of forming a continuous weld comprising the steps of moving a member to be welded relative to a pulsed high energy density welding means, forming a continuous weld along said member with a plurality of overlapping welds formed by a plurality of short duration pulses of energy from said pulsed welding means having an average power density of at least $10^6$ watts/inch$^2$, continuously detecting the position of the member in the vicinity of the pulsed high energy density welding means, and pulsing said high energy density welding means in response to the detected position of the member so that the welds formed by said pulses overlap in a predetermined manner independent of the speed of movement of the member.

22. A method of forming a continuous weld according to claim 21, wherein said pulses of energy are pulses of laser energy.

23. A method of forming a continuous weld comprising the steps of moving a member to be welded relative to a pulsed high energy density welding means for producing a plurality of short duration pulses of high density energy, forming a continuous weld along said member with a plurality of overlapping welds formed by a plurality of short duration pulses of energy from said pulsed welding means having an average power density of at least $10^6$ watts /inch$^2$, continuously detecting the position of the member in the vicinity of the pulsed welding means, and adjusting the power of the pulses from the pulsed welding means in a predetermined manner in respone to the detected position of the member.

24. Apparatus for pulsed welding comprising a pulsed high energy density welding means for producing a plurality of short duration pulses of high density energy, means for moving a member to be welded relative to the pulsed high energy density welding means, means for continuously detecting the position of the member in the vicinity of the pulsed high energy density welding means, and means for pulsing said pulsed welding means in response to the detected position of said moving member so that the location of the welds formed by the pulses of high density energy from said pulsed welding means can be accurately controlled with respect to the member independent of the speed of movement of the member.

25. Apparatus for pulsed welding comprising a pulsed high energy density welding means, means for moving a member to be welded relative to the pulsed high energy density welding means, means for continuously detecting the position of the member in the vicinity of the pulsed high energy density welding means, and means for pulsing said pulsed welding means in response to the detected position of said moving member so that the location of the welds formed by the pulses of high density energy from said pulsed welding means can be accurately controlled with respect to the member independent of the speed of movement of the member.

26. An apparatus for pulsed welding according to claim 25, wherein said pulsed high energy density welding means is a pulsed laser welding means.

27. An apparatus for pulsed welding according to claim 26, wherein said pulsed laser welding means is an electronically pulsed gas laser.

28. An apparatus for pulsed welding according to claim 26, wherein said pulsed laser welding means includes means for producing a continuous laser beam and means for repeatedly interrupting said beam at a high frequency to produce pulses of laser energy.

29. Apparatus for pulsed welding comprising a pulsed high energy density welding means for producing a plurality of pulses of high density energy, means for moving a member to be welded relative to the pulsed high energy density welding means, means for continuously detecting the position of the moving member in the vicinity of the pulsed welding means, and means for adjusting the power of the pulses from said pulsed welding means in a predetermined manner in response to the detected position of the member.

30. An apparatus for pulsed welding according to claim 29, wherein said pulsed high energy density welding means is a pulsed laser welding means.

31. An apparatus for forming a continuous weld according to claim 12, wherein said means for detecting the movement of the moving member includes a photosensor located adjacent the welding site to detect light emitted by the weld plasma.

* * * * *